(12) United States Patent
Hoyda et al.

(10) Patent No.: US 10,046,703 B2
(45) Date of Patent: *Aug. 14, 2018

(54) SYSTEM AND PROCESS FOR VIEWING IN BLIND SPOTS

(71) Applicant: Serge B. Hoyda, Great Neck, NY (US)

(72) Inventors: Serge B. Hoyda, Great Neck, NY (US); Zachary Bernard Hines, Jackson Heights, NY (US)

(73) Assignee: Serge B. Hoyda, Great Neck, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/898,129

(22) PCT Filed: Dec. 11, 2015

(86) PCT No.: PCT/US2015/065255
§ 371 (c)(1),
(2) Date: Dec. 12, 2015

(87) PCT Pub. No.: WO2016/094801
PCT Pub. Date: Jun. 16, 2016

(65) Prior Publication Data
US 2017/0267176 A1 Sep. 21, 2017

Related U.S. Application Data

(60) Provisional application No. 62/091,346, filed on Dec. 12, 2014, provisional application No. 62/181,170, filed on Jun. 17, 2015.

(51) Int. Cl.
*H04N 7/18* (2006.01)
*B60R 1/00* (2006.01)
(Continued)

(52) U.S. Cl.
CPC .............. *B60R 1/002* (2013.01); *B60K 35/00* (2013.01); *B60R 1/00* (2013.01); *B60R 11/04* (2013.01);
(Continued)

(58) Field of Classification Search
CPC ..... B60R 1/00; B60R 11/04; B60R 2300/105; B60R 2300/30; B60R 2300/202;
(Continued)

(56) References Cited

U.S. PATENT DOCUMENTS 4,892,386 A 1/1990 Suzuki et al.
5,096,287 A 3/1992 Kakinami et al.
(Continued)

FOREIGN PATENT DOCUMENTS

EP 0 990 834 A1 4/2000
WO 2006/027563 A1 3/2006
(Continued)

OTHER PUBLICATIONS

International Search Report of PCT/US15/65255, dated Mar. 29, 2016.
(Continued)

*Primary Examiner* — Allen C Wong
(74) *Attorney, Agent, or Firm* — Collard & Roe, P.C.

(57) ABSTRACT

There is disclosed a viewing system coupled to a motor vehicle having a frame having a roof, at least one support, and a body with the at least one support supporting the roof over the body. The system can comprise at least one camera, at least one screen coupled to the support. In addition each camera is coupled to the at least one support and wherein said at least one screen is in communication with the first set of cameras, wherein said at least one screen displays images presented by the first set of cameras. This device can provide additional view in the blind spot of the vehicle.

15 Claims, 40 Drawing Sheets

(51) Int. Cl.
| | | |
|---|---|---|
| *B60R 11/04* | (2006.01) | |
| *G08G 1/16* | (2006.01) | |
| *B60K 35/00* | (2006.01) | |
| *G06K 9/00* | (2006.01) | |
| *H04N 5/77* | (2006.01) | |
| *B60R 11/00* | (2006.01) | |

(52) U.S. Cl.
CPC ......... *G06K 9/00791* (2013.01); *G08G 1/167* (2013.01); *H04N 5/772* (2013.01); *H04N 7/181* (2013.01); *H05K 999/99* (2013.01); *B60K 2350/2013* (2013.01); *B60K 2350/2052* (2013.01); *B60R 2011/004* (2013.01); *B60R 2011/0033* (2013.01); *B60R 2011/0052* (2013.01); *B60R 2011/0071* (2013.01); *B60R 2011/0073* (2013.01); *B60R 2011/0089* (2013.01); *B60R 2300/105* (2013.01); *B60R 2300/202* (2013.01); *B60R 2300/30* (2013.01); *B60R 2300/8026* (2013.01)

(58) Field of Classification Search
CPC ..... B60R 2300/8026; B60R 2011/0089; B60R 2011/0052; B60R 2011/004; B60R 2011/0033; G08G 1/167; G06K 9/00791; H04N 5/772; H04N 7/181; B60K 35/00; B60K 2350/2013; B60K 2350/2052
USPC ......................................................... 348/148
See application file for complete search history.

(56) References Cited

U.S. PATENT DOCUMENTS

| | | | |
|---|---|---|---|
| 5,727,960 | A | 3/1998 | Zehrung |
| 6,115,651 | A | 9/2000 | Cruz |
| 6,122,865 | A | 9/2000 | Branc et al. |
| 6,859,148 | B2 | 2/2005 | Miller et al. |
| 6,954,152 | B1 | 10/2005 | Matthews |
| 7,049,945 | B2 | 5/2006 | Breed et al. |
| 8,004,425 | B2 | 8/2011 | Hoek et al. |
| 8,624,716 | B2 | 1/2014 | Englander |
| 2002/0003571 | A1* | 1/2002 | Schofield ................ B60C 23/00 348/148 |
| 2002/0124479 | A1 | 9/2002 | Branc et al. |
| 2003/0095185 | A1 | 5/2003 | Naifeh |
| 2004/0211868 | A1 | 10/2004 | Holmes et al. |
| 2006/0197019 | A1* | 9/2006 | Satou ........................ G01S 7/51 250/338.1 |
| 2006/0221183 | A1 | 10/2006 | Sham |
| 2007/0035385 | A1 | 2/2007 | Miyahara |
| 2007/0080267 | A1 | 4/2007 | Richter |
| 2007/0084500 | A1 | 4/2007 | Chen |
| 2007/0170321 | A1 | 7/2007 | Smed |
| 2008/0099655 | A1 | 5/2008 | Goodman |
| 2008/0117298 | A1 | 5/2008 | Torres |
| 2008/0136915 | A1 | 6/2008 | Iwamura |
| 2008/0203308 | A1 | 8/2008 | Yoo |
| 2009/0091618 | A1 | 4/2009 | Anderson |
| 2010/0231719 | A1* | 9/2010 | Nakamura ............. B60R 11/04 348/148 |
| 2010/0315507 | A1* | 12/2010 | Chrobocinski .. G08B 13/19643 348/143 |
| 2010/0321408 | A1 | 12/2010 | Miceli et al. |
| 2011/0267466 | A1 | 11/2011 | Brester |
| 2012/0105638 | A1* | 5/2012 | Englander ................ B60Q 1/24 348/148 |
| 2013/0169469 | A1 | 7/2013 | Mitsuta et al. |
| 2013/0193173 | A1 | 8/2013 | Bonito et al. |
| 2015/0002633 | A1 | 1/2015 | Hayashi et al. |
| 2015/0002642 | A1 | 1/2015 | Dressler |
| 2015/0282346 | A1* | 10/2015 | Ganim ................ H05K 5/0204 361/807 |
| 2016/0050399 | A1 | 2/2016 | Chuter et al. |
| 2016/0062217 | A1 | 3/2016 | Slater |
| 2016/0288713 | A1 | 10/2016 | Hoyda et al. |
| 2017/0026555 | A1 | 1/2017 | Hoyda et al. |

FOREIGN PATENT DOCUMENTS

| | | |
|---|---|---|
| WO | 2007/081894 A2 | 7/2007 |
| WO | 2014/162260 A1 | 10/2014 |
| WO | 2016/094801 A1 | 6/2016 |
| WO | 2016/094882 A1 | 6/2016 |

OTHER PUBLICATIONS

International Search Report of PCT/US15/65407, dated Feb. 25, 2016.
International Preliminary Report on Patentability and Written Opinion of the International Searching Authority of PCT/US2015/065255 dated Jun. 22, 2017.
International Preliminary Report on Patentability and Written Opinion of the International Searching Authority of PCT/US2015/065407 dated Jun. 22, 2017.
Non-Final Office Action in U.S. Appl. No. 15/161,173 dated Jan. 30, 2017.
Final Office Action in U.S. Appl. No. 15/161,173 dated Apr. 24, 2017.
International Search Report and Written Opinion of the International Searching Authority with Notice of Transmittal of the International Search Report and Written Opinion of PCT/US17/27972, dated Jun. 29, 2017.
Non-Final Office Action in U.S. Appl. No. 14/898,130 dated Jul. 31, 2017.
Non-Final Office Action in U.S. Appl. No. 15/161,189 dated Nov. 3, 2016.
Final Office Action in U.S. Appl. No. 15/161,189 dated Mar. 9, 2017.
Non-Final Office Action in U.S. Appl. No. 15/161,173 dated Sep. 6, 2017.
Final Office Action in U.S. Appl. No. 15/161,173 dated Nov. 13, 2017.
Final Office Action in U.S. Appl. No. 14/898,130 dated Nov. 15, 2017.

* cited by examiner

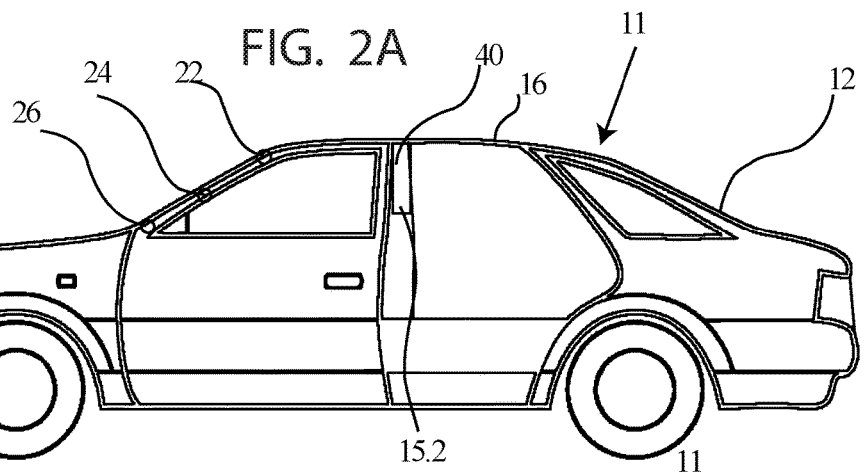
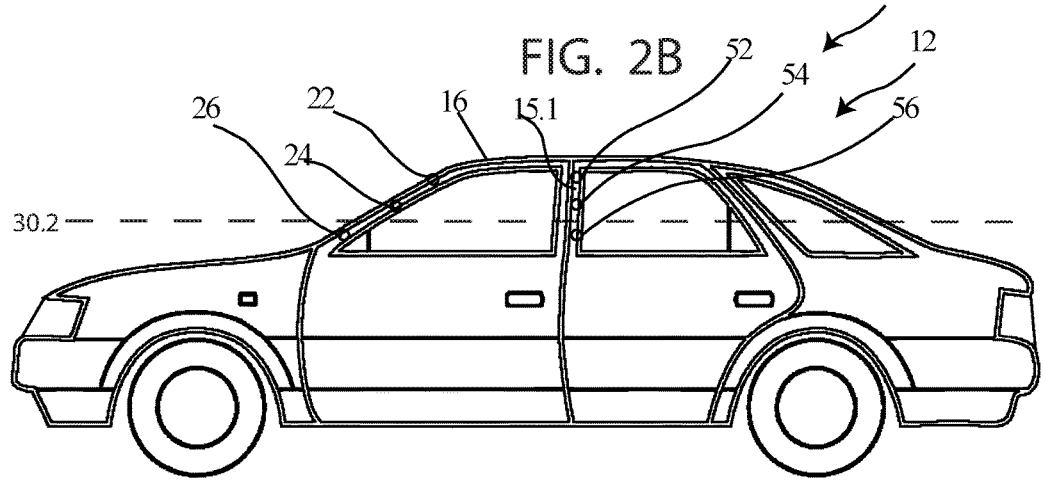
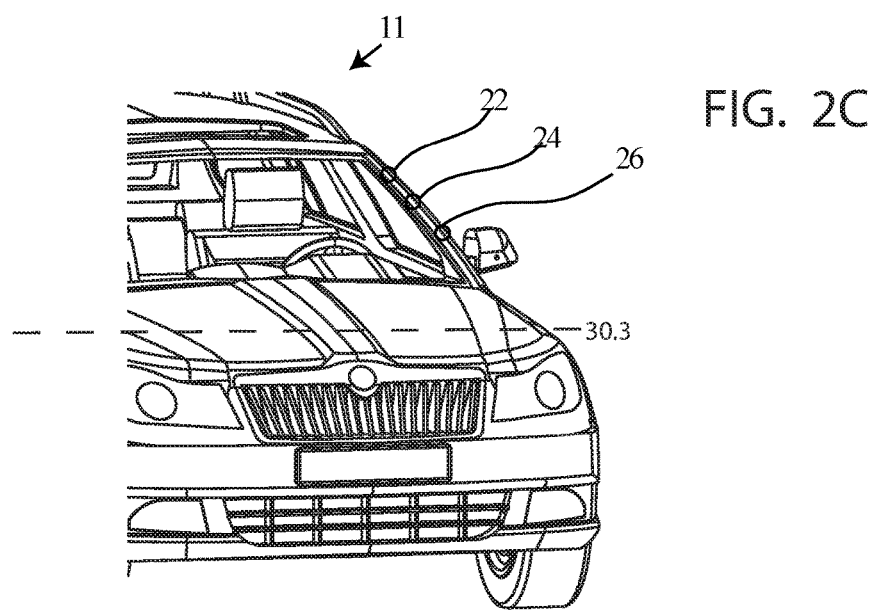

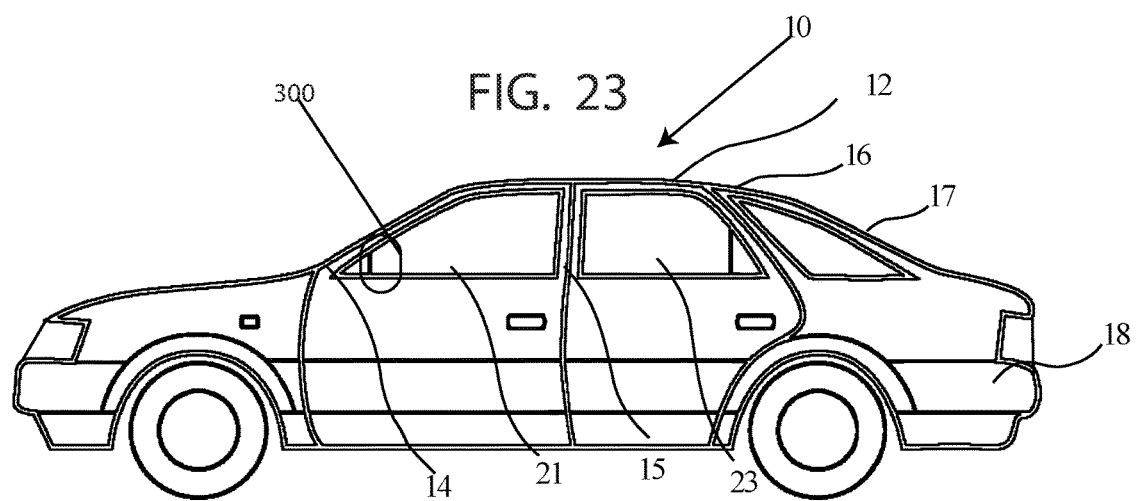

SYSTEM AND PROCESS FOR VIEWING IN BLIND SPOTS

CROSS REFERENCE TO RELATED APPLICATIONS

This application is a National Stage Application that claims priority from PCT/US15/65255 filed on Dec. 11, 2015 wherein the PCT application claims priority from 62/091,346 filed on Dec. 12, 2014 and Ser. No. 62/181,170 filed on Jun. 17, 2015. This application is also a non-provisional application that claims priority to two provisional applications including Ser. No. 62/091,346 filed on Dec. 12, 2014 and Ser. No. 62/181,170 filed on Jun. 17, 2015, wherein the disclosure of these two applications are hereby incorporated by reference in their entirety.

BACKGROUND

One embodiment relates to a display and video system for viewing blind spots which is configured to expand the viewing area for operators of autos, or motor vehicles, planes, or boats. Sometimes viewers encounter blind spots and cannot see around obstructions blinding these blind spots. Therefore, there is a need to have additional viewing areas for users so that people can see in the blind spots.

SUMMARY

In one embodiment, there is disclosed a viewing system coupled to a device such as a motor vehicle, a plane, a boat having a frame, having a roof, at least one support, and a body with the at least one support supporting the roof over the body. The system can comprise a first set of cameras at least one screen coupled to the support. In addition, the first set of cameras are also coupled to the at least one support and wherein said at least one screen is in communication with the first set of cameras, wherein said at least one screen displays images presented by the first set of cameras.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 2A is a side cut-away view of another embodiment;
FIG. 2B is a side view of the embodiment shown in FIG. 2A;
FIG. 2C is a front view of the embodiment shown in FIG. 2A;
FIG. 23 is a side view of an auto having a camera installed therein.

DETAILED DESCRIPTION

Figure 1A:
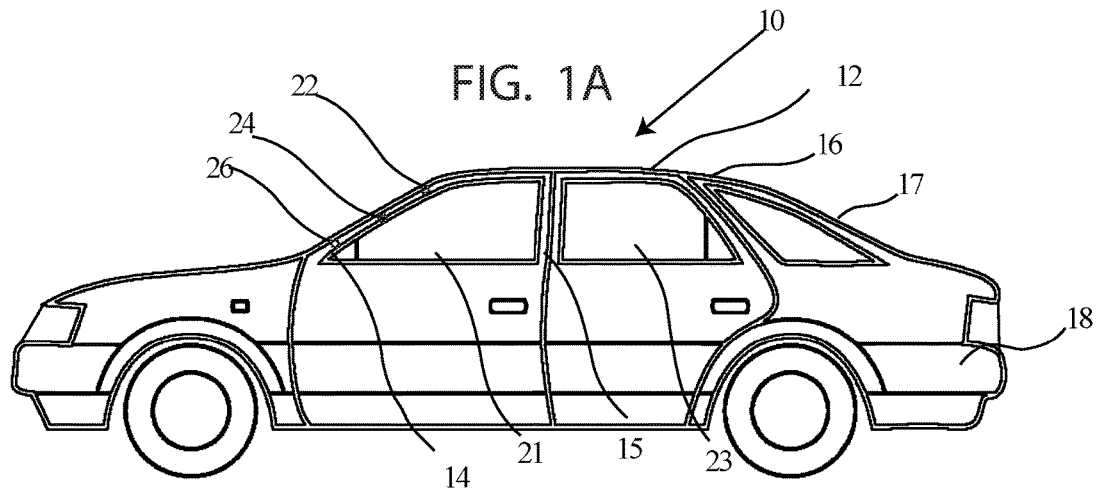
FIG. 1A is a side view of one embodiment.

FIG. 1A is a side view of one embodiment. This embodiment 10 shows an automobile 12 having a frame comprising a body 18, a roof 16, and supports 14 and 15.

Supports 14 and 15 support the roof over the body. Windows such as front windshield 19 are positioned between supports 14.1 and 14.2. Support 14 comprises both supports 14.1 and 14.2. Support 15 comprises both supports 15.1 and 15.2. There is also a rear support 17 which is also useful in supporting roof 16 over body 18. Side windows 21 and 23 are interspersed between roof 16 and body 18 as well.

Figure 1B:
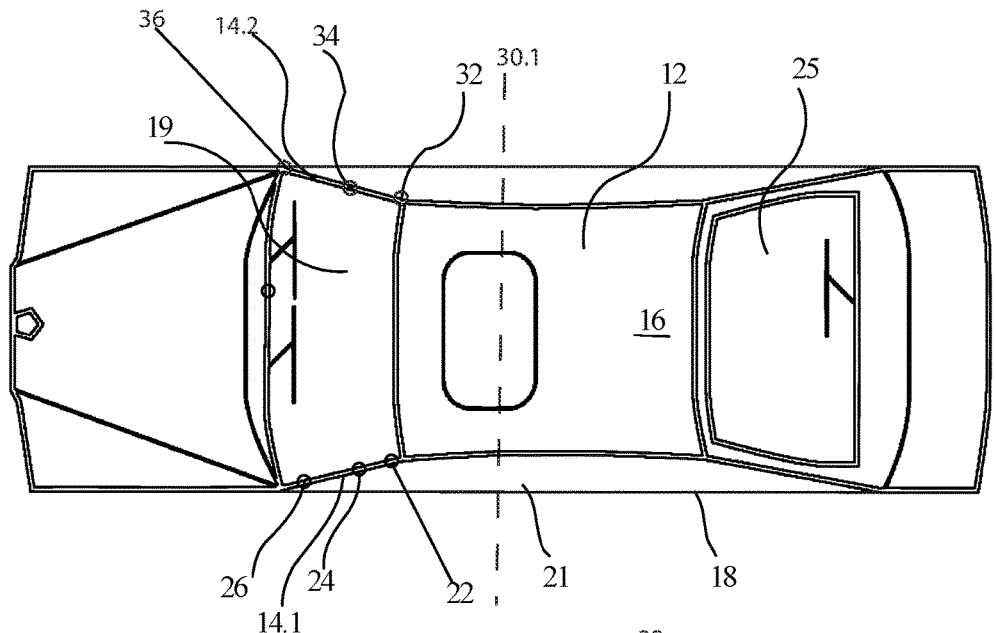
FIG. 1B is a top view of the embodiment shown in FIG. 1.

FIG. 1B is a top view of the embodiment shown in FIG. 1A. In this view there is windshield 19 as well as back windshield 25. The top of roof 16 is also shown. In addition, there is shown the two sides of the auto with supports 14.1 and 14.2 each having multiple cameras such as at least one camera. There are for example, three cameras 22, 24, and 26 in the first side support 14.1. In addition there is an additional support 14.2 which has additional cameras 32, 34, and 36 as well. There is also a dashed dotted line 30.1 which bisects the auto wherein in this view a front end of the auto is to the left side of the line and back end of the auto is to the right side of the line. Supports 14.1 and 14.2 sit at the front end of the auto.

Figure 1C:
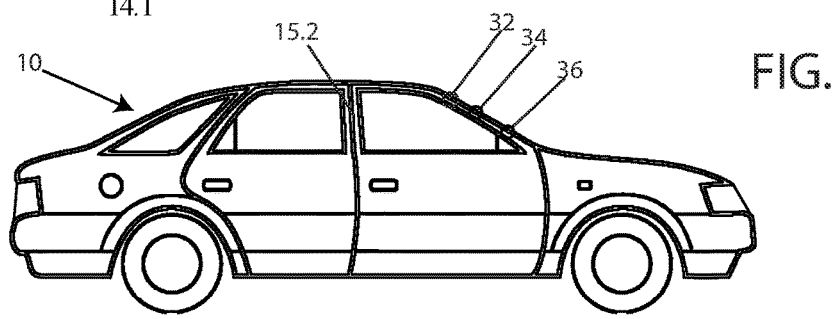
FIG. 1C shows an opposite side view of the embodiment shown in FIG. 1A.

FIG. 1C shows the opposite side showing cameras 32, 34, 36 and support 15.2 as well.

Thus, there could be at least one, but in this embodiment there are at least three cameras on each side of the supports 14.1 and 14.2 respectively. Because there are a plurality of cameras, on each side, each of these cameras provide additional depth perceptions because these cameras are positioned at different heights and different depths from the front of an automobile. These cameras 22, 24, 26, and 32, 34 and 36 are positioned between a front windshield of the auto 12.

FIG. 2A shows a side view of an automobile wherein this design shows another embodiment 11 which shows a screen 40 which shows the images or view inside of an automobile. This view also shows cameras 22, 24, and 26 coupled to supports 14. This view is a cut-away side view showing the interior of the vehicle. The positioning of this screen is in a middle section of the automobile on the support frame between the front seat of the auto and the back seat. The screen or display 40 is coupled to the frame section using a support structure such as that shown in FIG. 7A FIG. 2B is a side view of the embodiment shown in FIG. 2A. This view shows the exterior view. This exterior view shows additional cameras 52, 54, and 56 which are coupled to support 15.1 while as shown screen or display 40 is coupled to support 15.2. Cameras 52, 54, and 56 are in communication with an associated screen such as screen 40 shown on an associated support such as support 15.1. Thus, the screen is located just inside of the cameras. This view also shows a bisecting line 30.2 on FIG. 2B which extends substantially horizontally and which forms a bisecting line bisecting the auto so that a bottom half is shown below the bisecting line and a top half is shown above the bisecting line. Thus, the cameras and associated displays are shown in a top half of the auto. For example, cameras 22, 24, and 26 and the associated display are shown in the top front section of the auto to cover blind spots in the top front viewing region of the auto.

FIG. 2C shows a front view of the auto of the embodiment 11 which shows cameras 22, 24, and 26 on support 14.1 while cameras 32, 34, and 36 are positioned on support 14.2. This view shows a bisecting line 30.3 which bisects the auto and extends in a substantially horizontal plane. Thus above this line 30.3 is a top half of the auto and below this line is a bottom half of the auto.

Figure 3A:
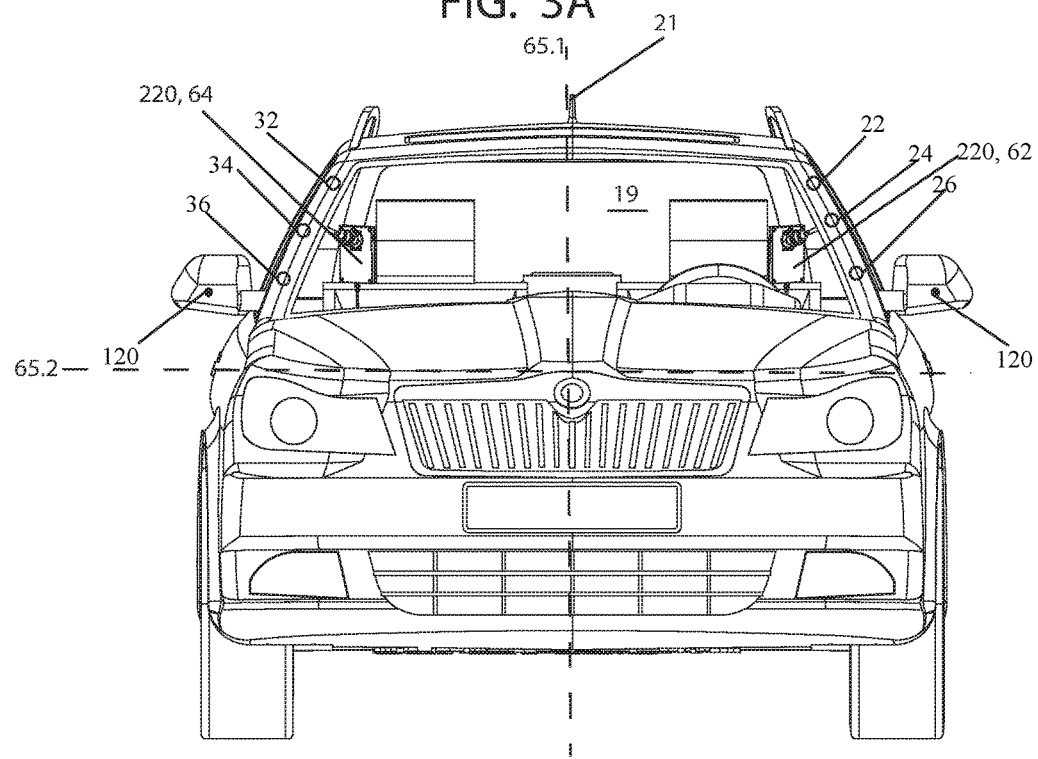
FIG. 3A is a front view of an auto of the embodiment of either FIG. 1A or FIG. 2A.

FIG. 3A is an inside view of an auto of the embodiment of either FIG. 1A or FIG. 2A. In this view, it shows a video screen 62, or screen 220 (See FIG. 22) positioned on the inside surface of support 14.1 (See FIG. 1B). This screen is in communication with associated cameras 22, 24, and 26 as well as camera 120 positioned on the side view mirror on that side of the car. Screen 64, or 220 is coupled to support 14.2. Screen 64 is associated with cameras 32, 34, and 36 as well as camera 120 on the side view mirror of that side of the car. In this view there is shown dashed dotted lines 65.1 and 65.2. Dashed line 65.1 bisects the auto in the middle with a vertical line and divides the auto into a right half and a left half from this perspective. Thus, the screens 62 and 64 are positioned on both the right half and the left half of the auto and generally or substantially on the top half of the auto along the supports 14.1 and 14.2 and adjacent to the windshield 19.

Figure 3B:
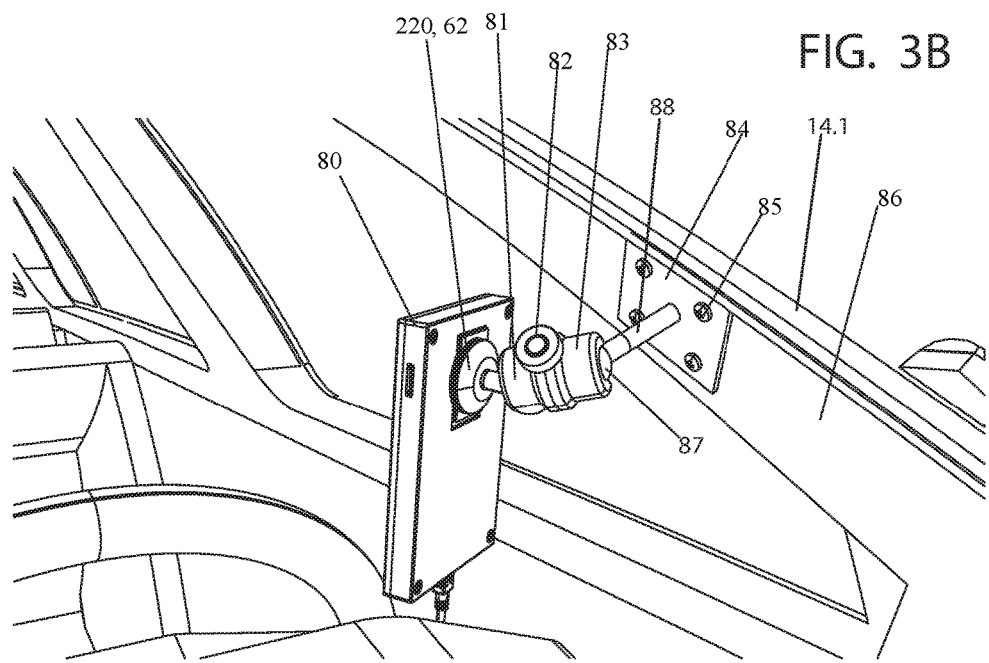
FIG. 3B is a front inside view of another embodiment.

FIG. 3B shows a front inside view of at least one screen 62, or 220, with a housing 80. There is also at least one first adjustment mechanism 81, a turn screw 82 for tightening and fixing the screen in place. The turn screw 82 fixes the housing section 83 around ball joint 87. Ball joint 87 is coupled to shaft 88. Shaft 88 is coupled to plate 84. Plate 84 is coupled to inside frame 86 via screws. Thus, with this embodiment, the screen system is coupled to inside section 86 of frame 14.1 so that this adjustable section makes the screen 62 adjustable in movement. This adjustable omnidirectional system is similar to that shown in FIGS. 11-13 as well.

Figure 4A:
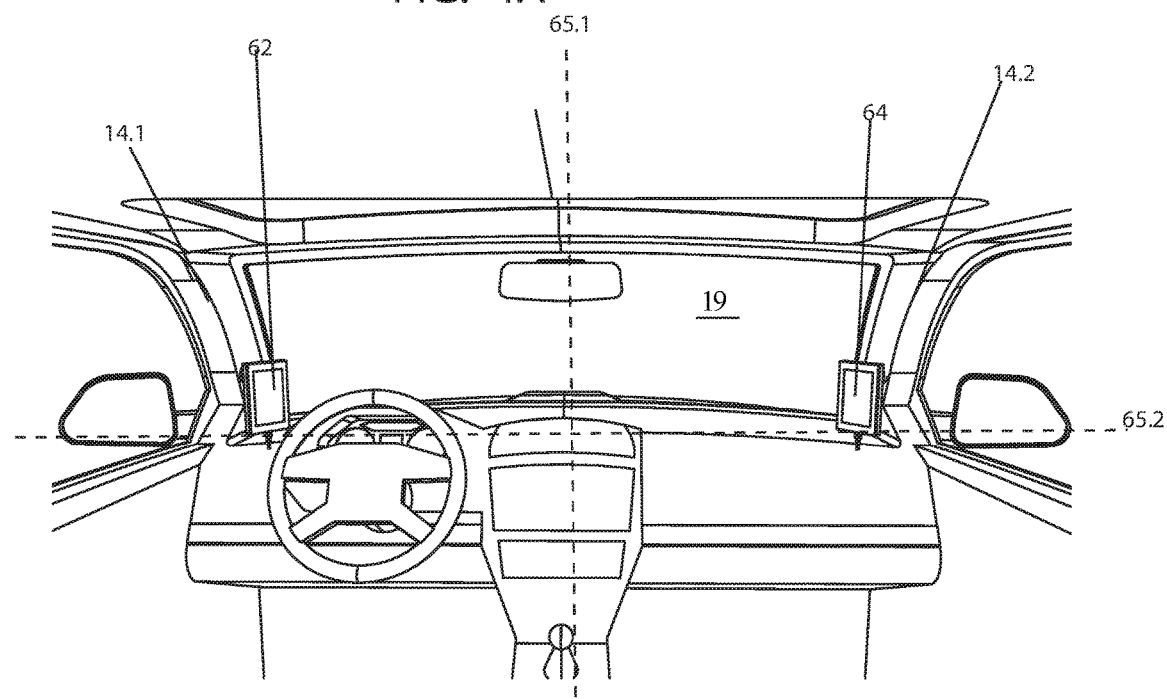
FIG. 4A is an inside view of an auto of the embodiment of either FIG. 1A or FIG. 2A.

FIG. 4A is an inside view of an auto of the embodiment of either FIG. 1A or FIG. 2A. This view shows screens 62 and 64 associated with respective cameras 22, 24, and 26, or cameras 32, 34, and 36. Screens 62 and 64 are similar to screens 220 or 511 and are coupled to the auto adjacent to supports 14.1 and 14.2. This view also shows the screens positioned on either side of bisecting line 65a in generally the top half of the auto.

Figure 4B:
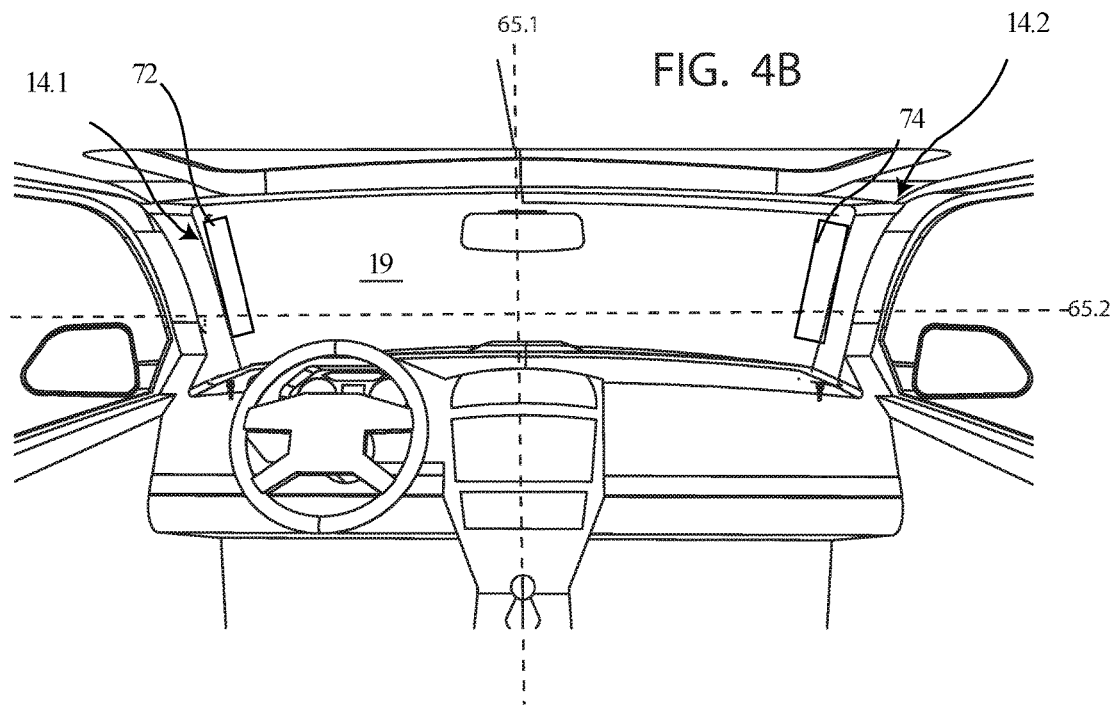
FIG. 4B is another view of the inside of the automobile.

FIG. 4B shows an inside view of an auto of the embodiment of FIG. 1A or FIG. 2A. In this view, there is bisecting line 65.1 as well as bisecting line 65.2. Bisecting line 65.1. Bisecting line 65.1 is substantially vertical while bisecting line 65.2 is substantially horizontal. On either side of bisecting line 65.1 are screens such as screens 72 or 74 which can be positioned inside of frames 14.1 and 14.2 and be used to display images from a camera. These images can be even three dimensional images created by multiple cameras such as cameras 22, 24, 26, 32, 34, 36, or cameras 100 or 120 which can be used to present an image that has depth and also be used to provide the user with an ability to judge the distance that a pedestrian or an automobile may be positioned from the automobile.

Figure 5:
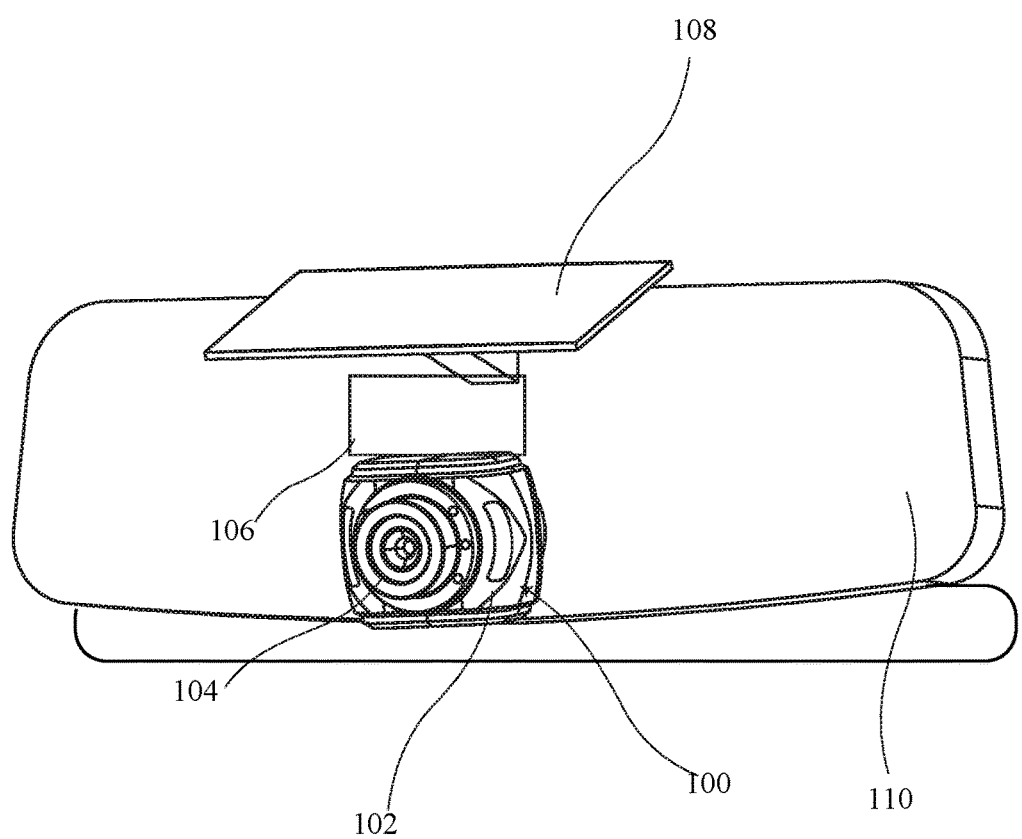
FIG. 5 is a view of an embodiment coupled to a rear view mirror.
Figure 6:
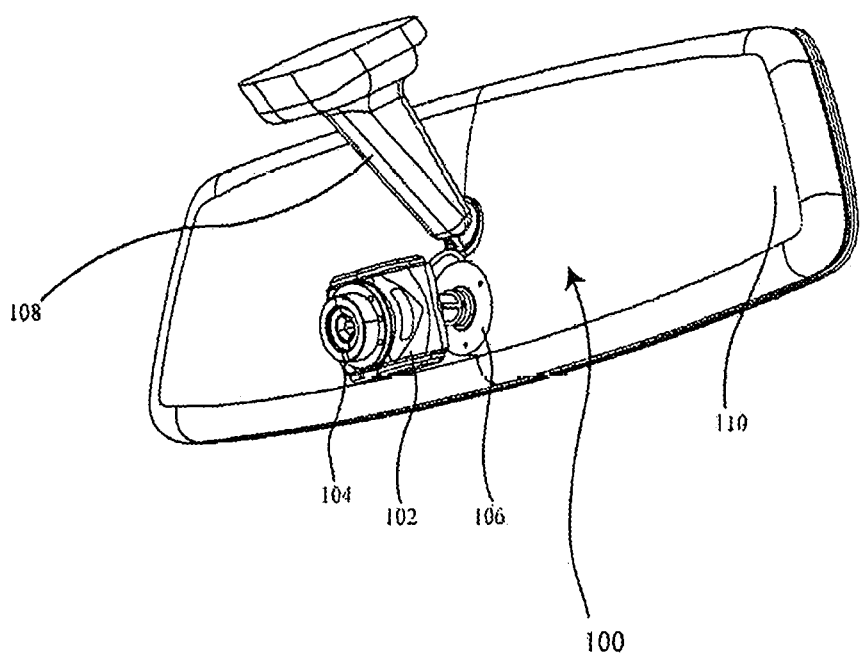
FIG. 6 is another view of the embodiment coupled to the rear view mirror
Figure 7:
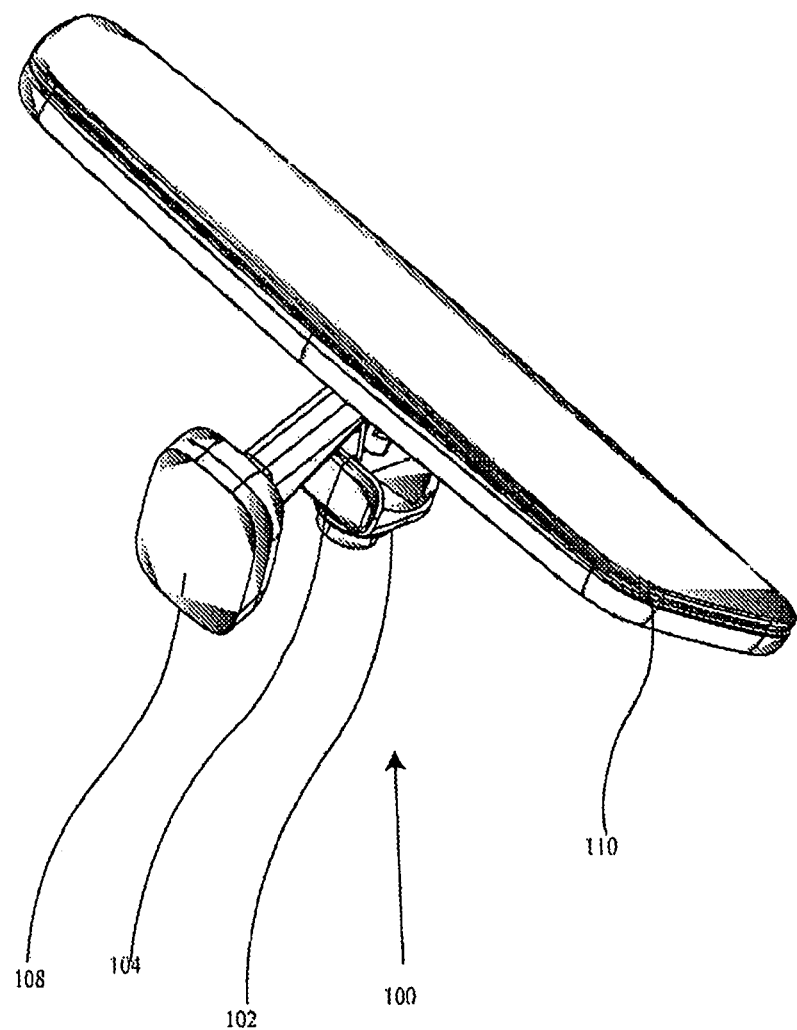
FIG. 7 is a side view of the embodiment of FIG. 5.

FIG. 5 is a side perspective view of a camera mounted on a rearview mirror. For example, there is a camera system 100, which includes a camera body 102, and a lens section 104 the camera body 102 is coupled to a bracket such as a support bracket 106. Bracket 106 is coupled to a mounting body 108. Body 108 is coupled to rearview mirror 110. Mounting body 108 can be coupled to a windshield or windscreen. In this way, camera 100, including camera body 102 can be positioned in front of rearview mirror 110 so that the user has blind spot recordability and visibility of this rearview mirror. FIGS. 6 and 7 show alternate views as well.

Figure 8:
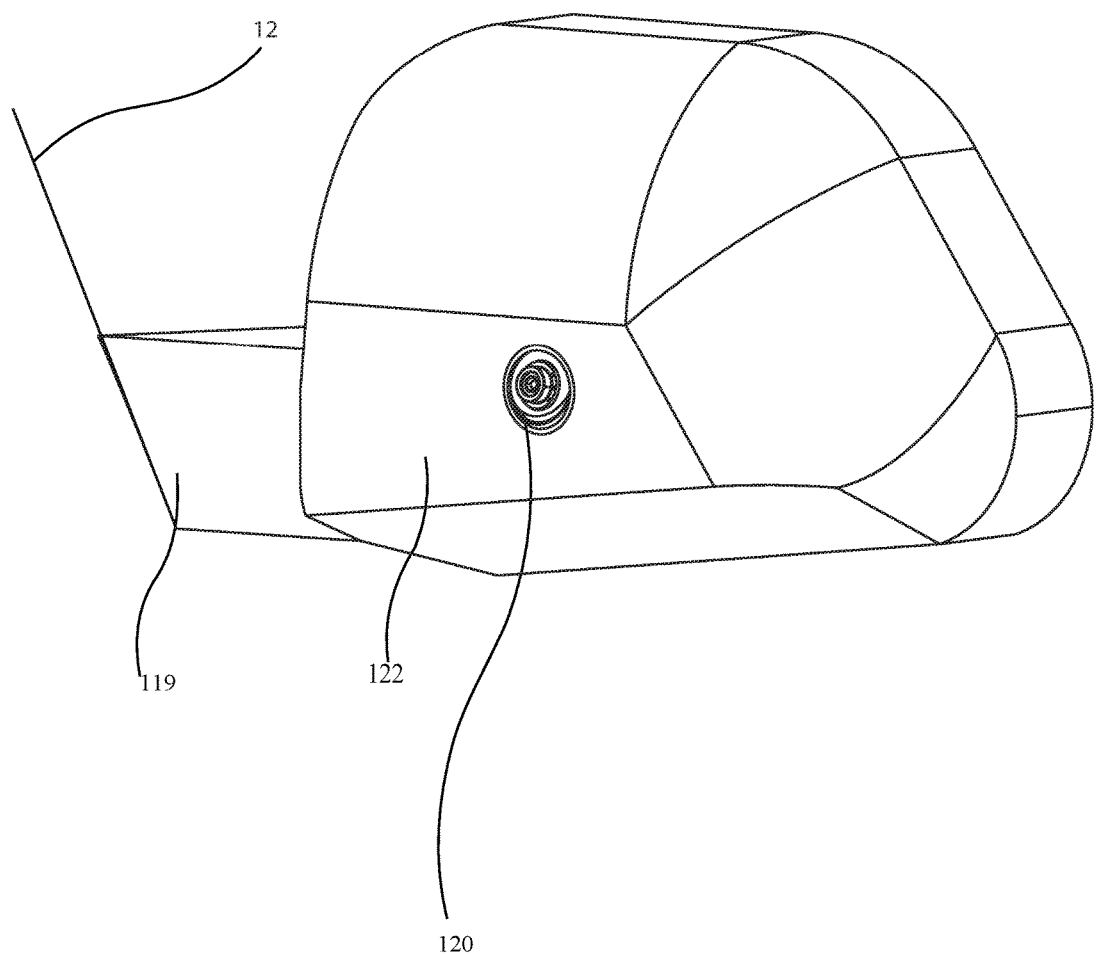
FIG. 8 is a view of a side view mirror with a camera on it.

FIG. 8 is a front view of a side view mirror 122 side view mirror 122 includes a camera 120. A cable such as cable or line 254 (See FIG. 19) can be fed along arm 119 into the body of the automobile 12. The cable can then be coupled into the systems electrical system as well as into the screens such as screens 62, 64, 72, 74, 220, 249, or 511.

Figure 9:
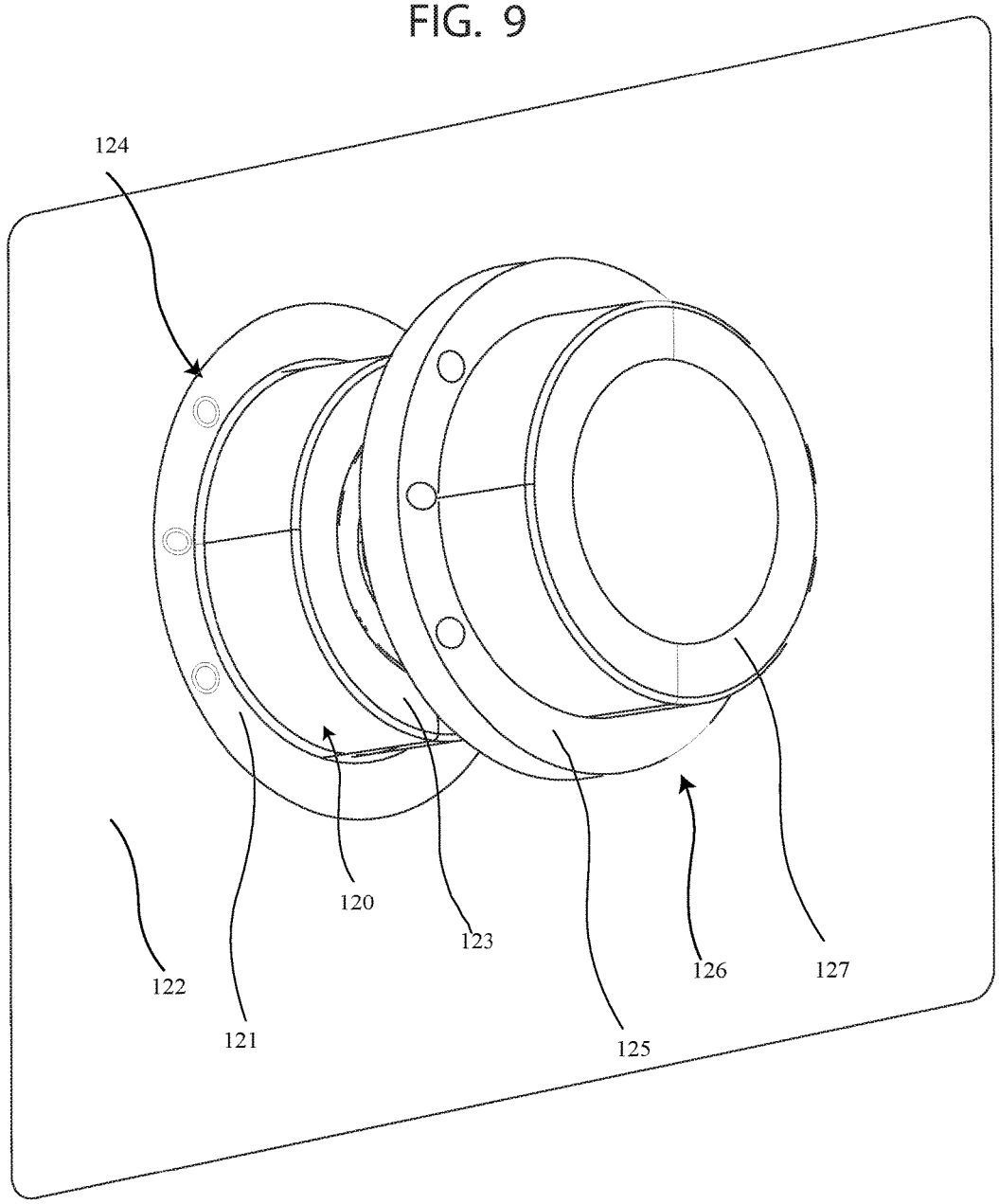
FIG. 9 is a side view of the side view mirror with the camera on it.

FIG. 9 shows a side exploded view of this camera 120. Cameras such as camera 120 can be placed in any region. For example, side view mirror 122 includes a mounting surface which is configured to receive mounting flange 121. This camera 120 can be positioned so that it is adjustable in angle and orientation. Coupled to mounting flange 121 is a lens body 123. A lens cover 126 is configured to cover over lens body 123. Lens cover 126 includes a lens flange 125, and lens cover section 127. Lens cover 126 is configured to cover over the camera, and protect it from the environment.

Figure 10A:
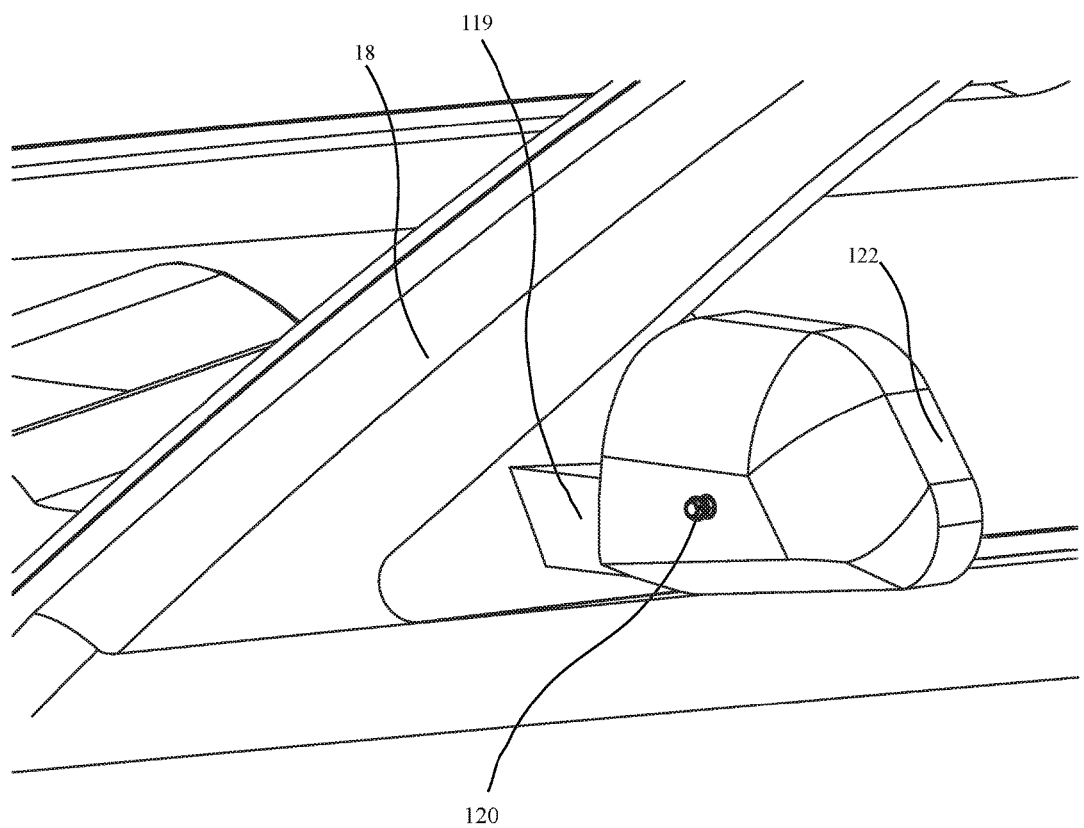
FIG. 10A is a front perspective view of a side view mirror with a camera on it.

FIG. 10A shows an alternate view of the side view mirror. For example, side view mirror 122 includes camera 120, wherein side view mirror 122 is coupled to arm 119, which is coupled to automobile body 18. A cable or line can feed from body 18 through arm 119 to camera 120 from the electrical and communications system of the auto.

Figure 10B:
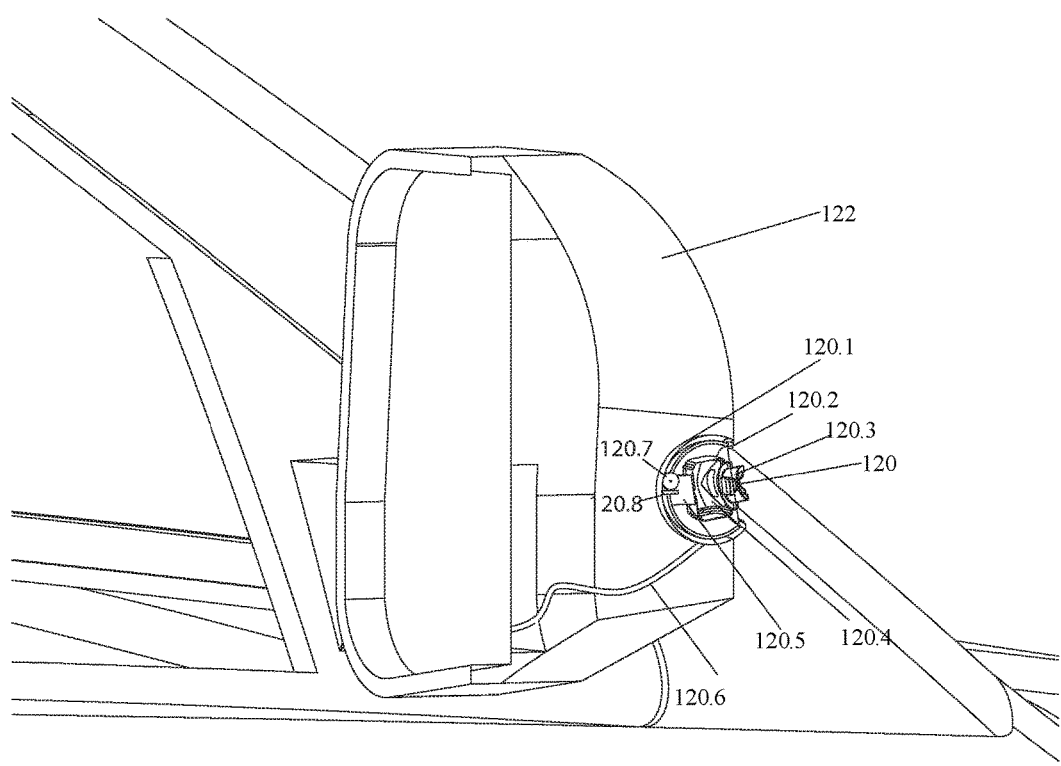
FIG. 10B is a side cross-sectional view of a mirror

FIG. 10B shows a side cross-sectional view of a camera system for a side view mirror 122. This view shows an inner shell 120.2 disposed inside of an outer shell 120.1. Inner shell 120.2 rotates within outer shell 120.1. There is a camera body 120.4 coupled to a lens section 120.3. A drive motor 120.5 is coupled to the camera body 120.4. Wheels 120.7 and 120.8 are coupled to drive motor 120.5 and are used to selectively drive the angle of attack, i.e. the direction of the camera lens 120.3 to a particular direction. Drive motor 120.5 is driven by cable 120.6. Cable 120.6 is powered by a battery or electrical system within the automobile.

Figure 11:
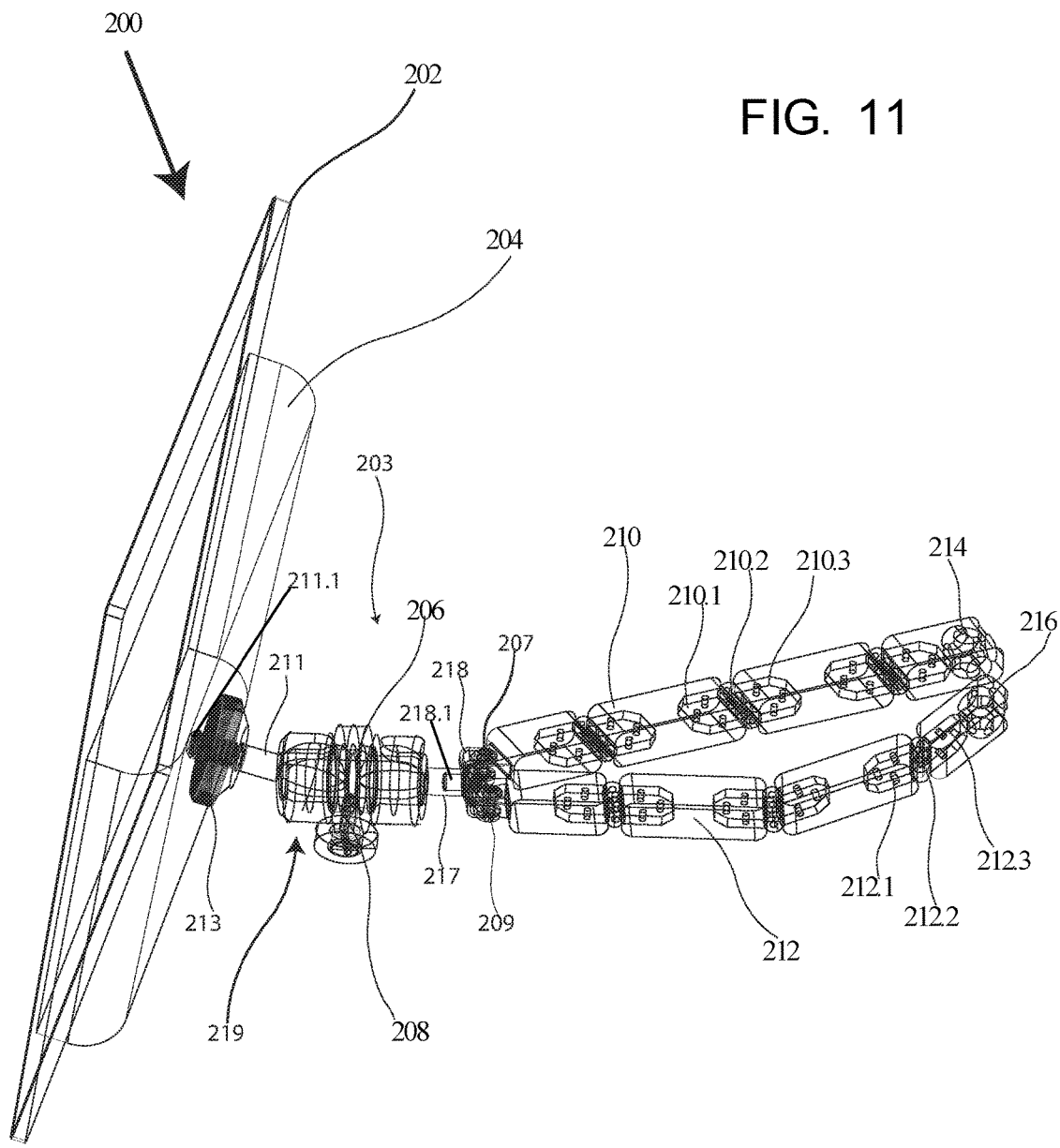
FIG. 11 is a side view of the screen with arms.

FIG. 11 is a side perspective view of a screen system 200. Screen system 200 includes a front screen 202, a screen body 204 coupled to the front screen 202. Coupled to screen body 204 is a bracket such as a support bracket comprising at least a screw adjuster 213. Screw adjuster 213 is configured to be screwed into the backend of screen body 204. Screen body 204 is configured to hold the electronic components of the screen. Screw adjuster 213 includes is threaded screw end 211.1. Coupled to screw adjuster 213 is an adjustable mounting arm 203. Adjustable mounting arm 203 includes an adjustable section 219, which includes a clamp body section 206, a clamp arm 208, a first end 211, and a second end 217. Second end 217 extends towards arms 210 and 212. Coupled between arms 210 and 212 and second end 217 is rotatable T connection 218. Rotatable T connection 218 includes screws or couplings 207 and 209. Arm, 210 is coupled to rotatable T connection 218 via screws or couplings 207. Arm 212 is coupled to rotatable T connection 218 via screw or coupling 209. Rotatable T connection 218 can be selectively secured via a screw such the T clamp screw 218.1. This screen system can be used in place of any of the screen systems mentioned herein such that these arms can wrap around supports 14.1 or 14.2 or 15.1 or 15.1. The screen can then be selectively coupled to a camera such as any one of the cameras mentioned herein such as cameras 22, 24, 26, 32, 34, 36, 52, 54, 56, 100, 120, 250, 390, 580.

Figure 12:
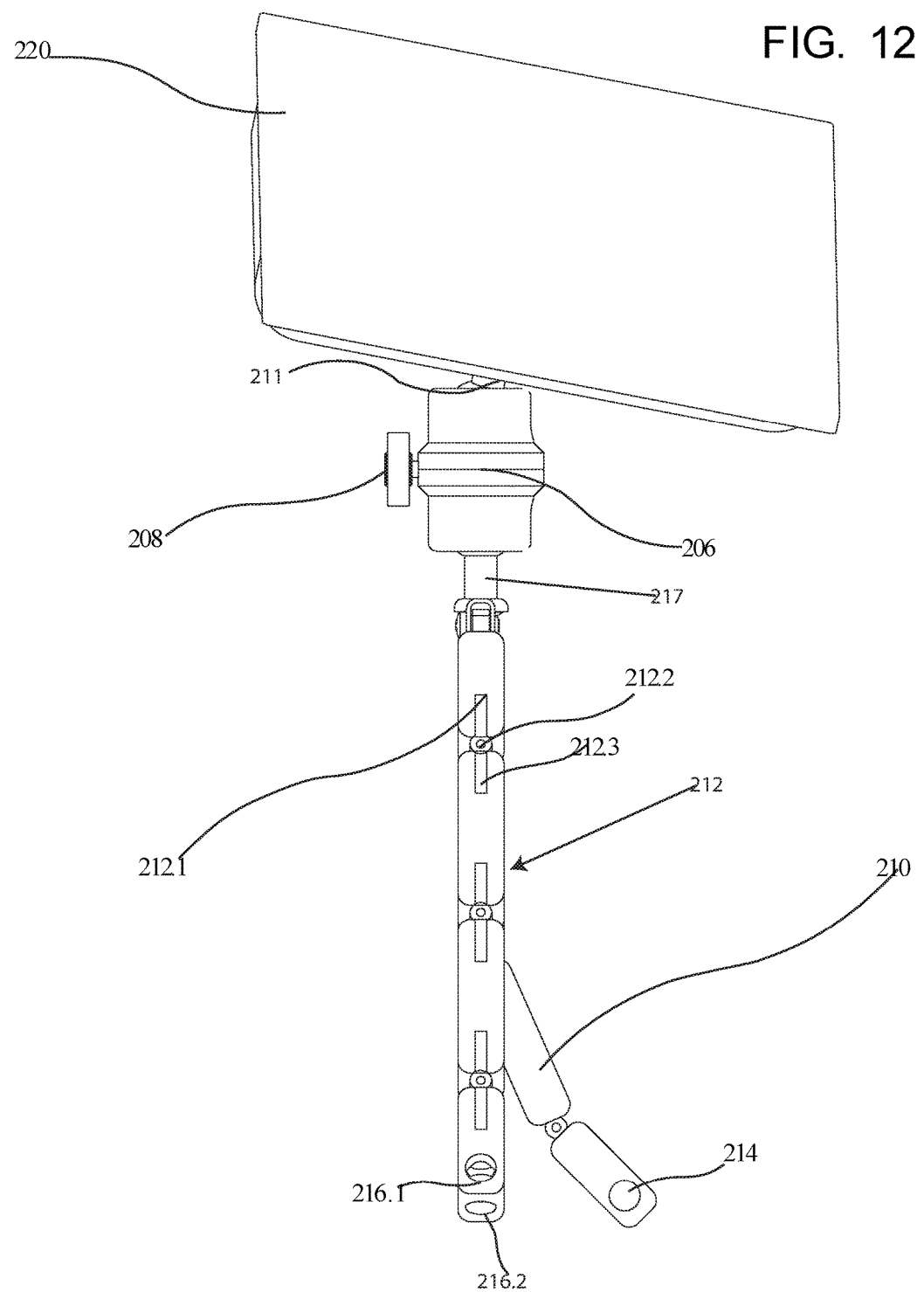
FIG. 12 is a front perspective view of the screen of FIG. 11.

Arm 210 includes a plurality of different sections, wherein each section is coupled together via a hinge. For example, there are hinge flanges 210.1 and 210.3 coupled to each other via an intermediate hinge section 210.2. These hinges allow for a flexible rotatable multidimensional arm which can then be wrapped around a column, a post or any other body support section of an automobile. In addition, arm 212 includes hinge connectors 212.1, and 212.3, which comprise flanges, and a hinge section 212.2. Positioned at the end of arm 212 are openings 216. In addition, position at the end of arm 210 is opening 214. Openings 216 and 214 are configured to be wrapped around and coupled to a post or body section of a moving vehicle such as an airplane a boat, a motor vehicle or any other device. These openings allow the screws to be screwed into a column or body of an automobile. FIG. 12 shows the upright view of this device showing a front view of screen 200 as well as openings 216.1 and 216.2 which are configured to receive a fastener. In addition opening 214 can be inserted between openings 216.1 and 216.2 to tie the ends together.

Figure 13:
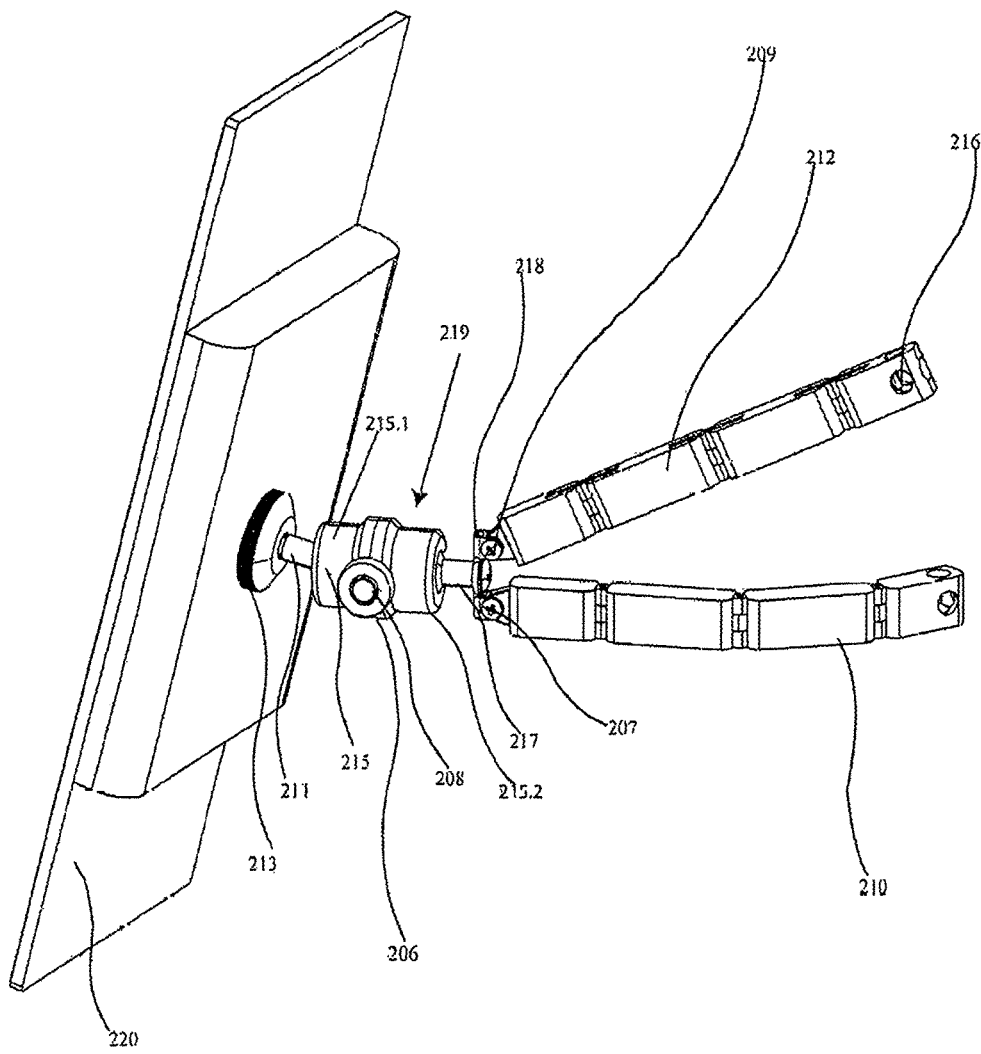
FIG. 13 is a side view of the screen of FIG. 11.

FIG. 13 shows the adjustable section 219. Adjustable section 219 includes a body 215 which includes a first body part 215.1 and second body part 215.2. In addition, there is also a clamp body section 206 and clamp arm 208.

Figure 14:
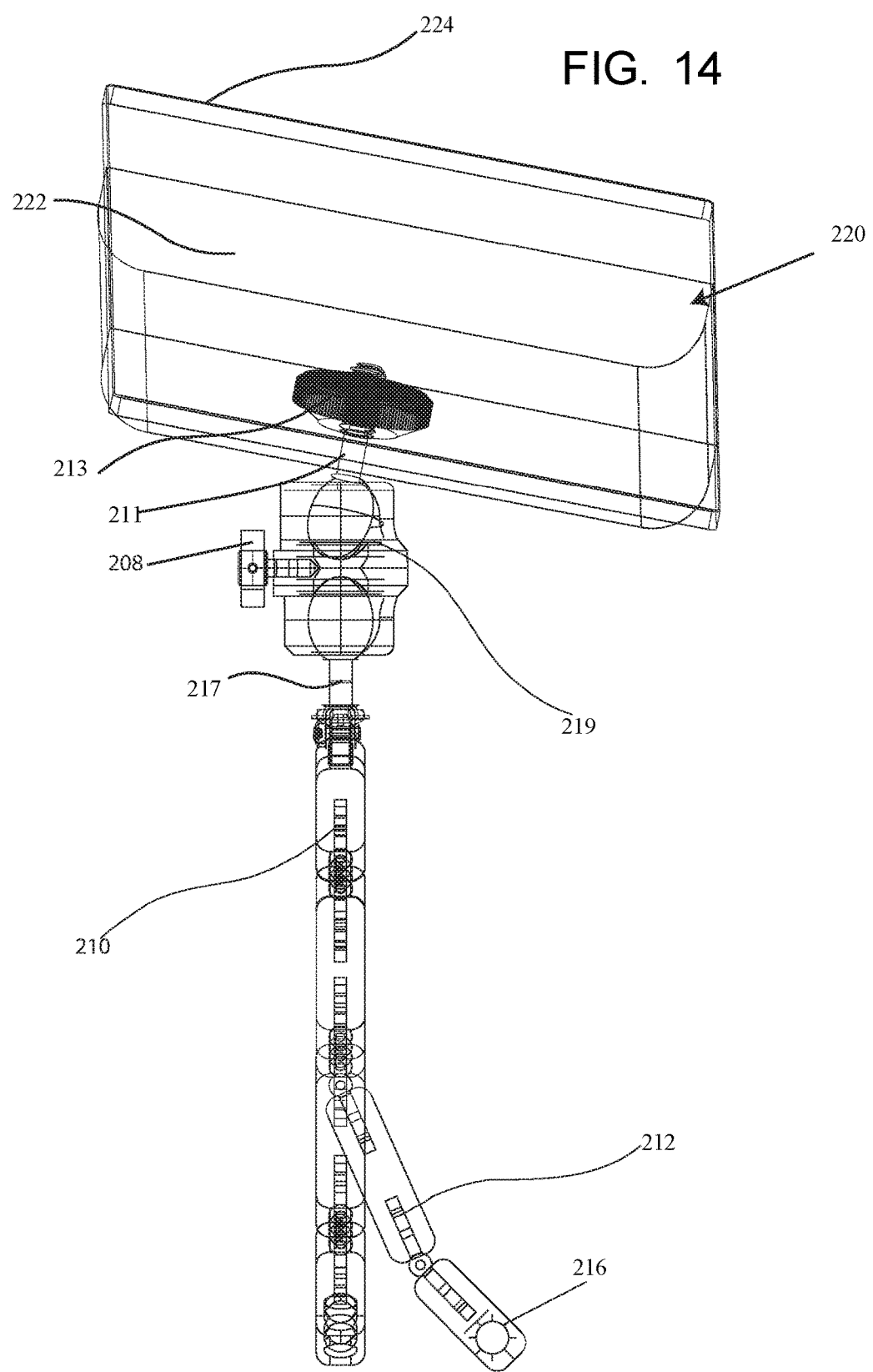
FIG. 14 is a back view of the screen of FIG. 11.
Figure 15:
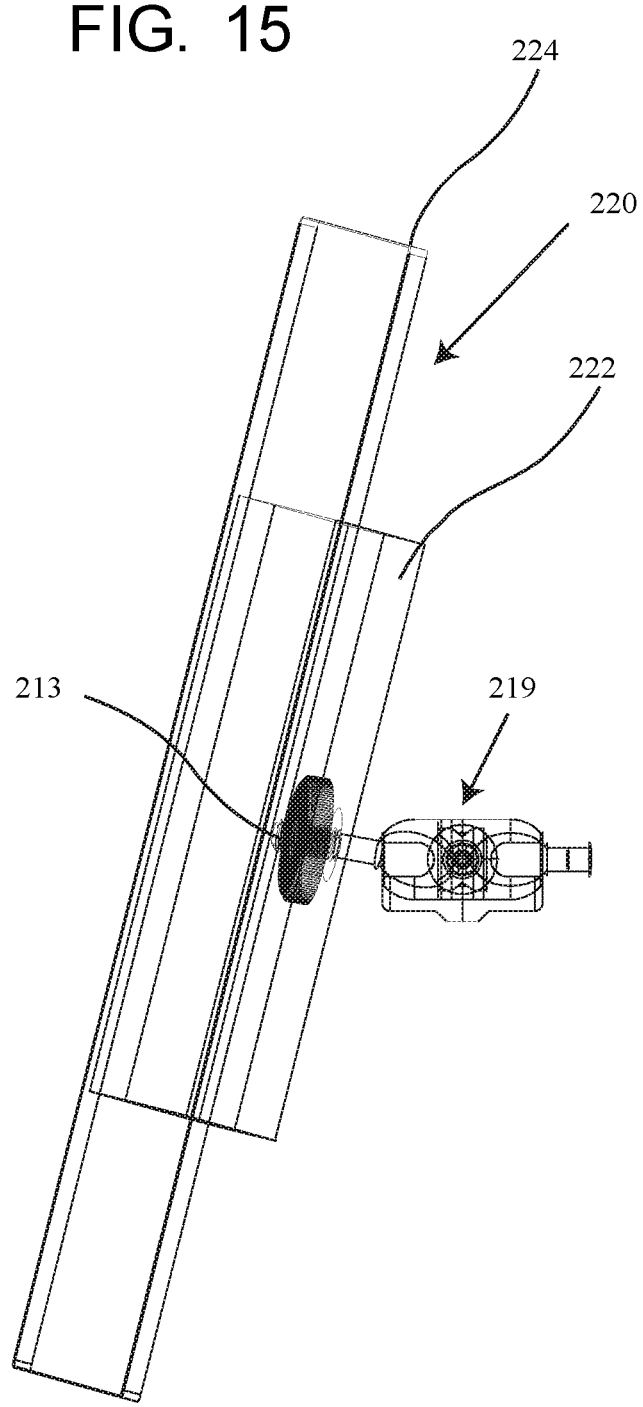
FIG. 15 is a side view of a portion of the device of FIG. 11.
Figure 16A:
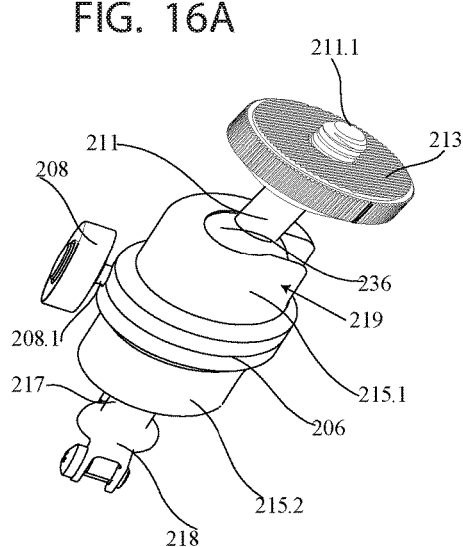
FIG. 16A is a side view of the adjustable connection of FIG. 15.
Figure 16B:
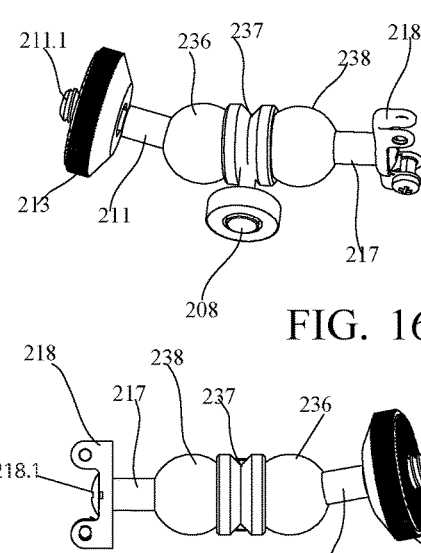
FIG. 16B is a side perspective view of a portion of the adjustable connection of FIG. 15.
Figure 16C:
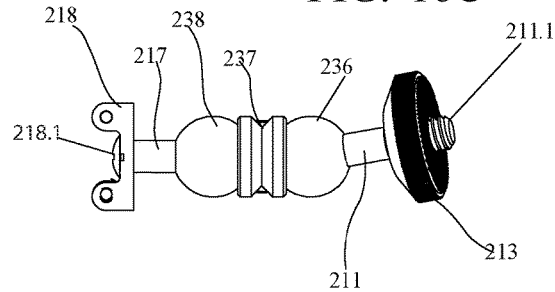
FIG. 16C is a side view of a portion of the adjustable connection of FIG. 15.
Figure 16D:
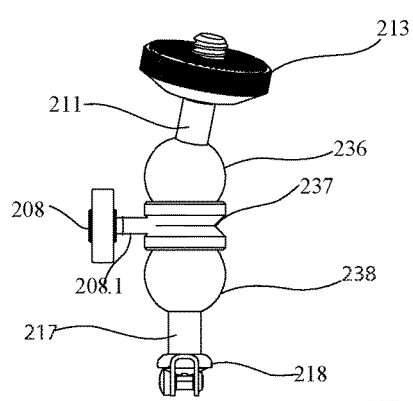
FIG. 16D is a side view of the adjustable connector of FIG. 16A.
Figure 16F:
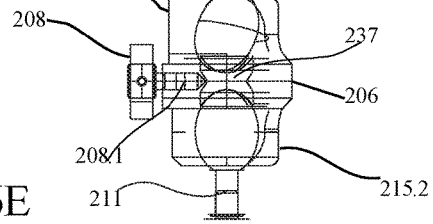
FIG. 16F shows a side see-thru view of the embodiment shown in FIG. 16A.
Figure 16E:
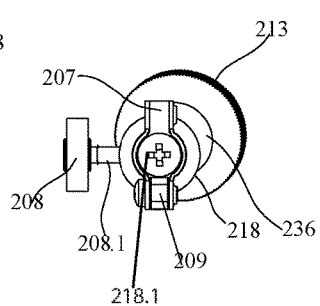
FIG. 16E shows an end view of the adjustable connector of FIG. 16A.

FIG. 14 shows a side transparent view of this adjustable section 219. FIG. 15 also shows the side transparent view as well. FIGS. 16A-16F show adjustable body section 219, which includes clamp 208, and clamp arm 208.1. When clamp 208 is rotated in a predetermined manner it drives clamp arm 208.1 into clamp body section 206.

FIGS. 16B through 16E show different views of adjustable section 219 with first body part 215.1 and second body part 215.2 removed. As shown in these views, there are a plurality of ball joints 236, and 238, positioned within a clamp seat 237. As clamp arm 208.1 is driven into clamp seat, 237, it exerts pressure on ball joints 238, and or 236 which one position within first body part 215.1, and second body part 215.2, respectively. This clamps the ball joint in a fixed position. Essentially, because there are two ball joints which are movable within the ball seat 237 creating a multidimensional, easily adjustable device which allows for positioning of the screen and almost any angle and in nearly any position. This omnidirectional double ball joint system is similar to that shown in FIG. 3B.

Figure 17:
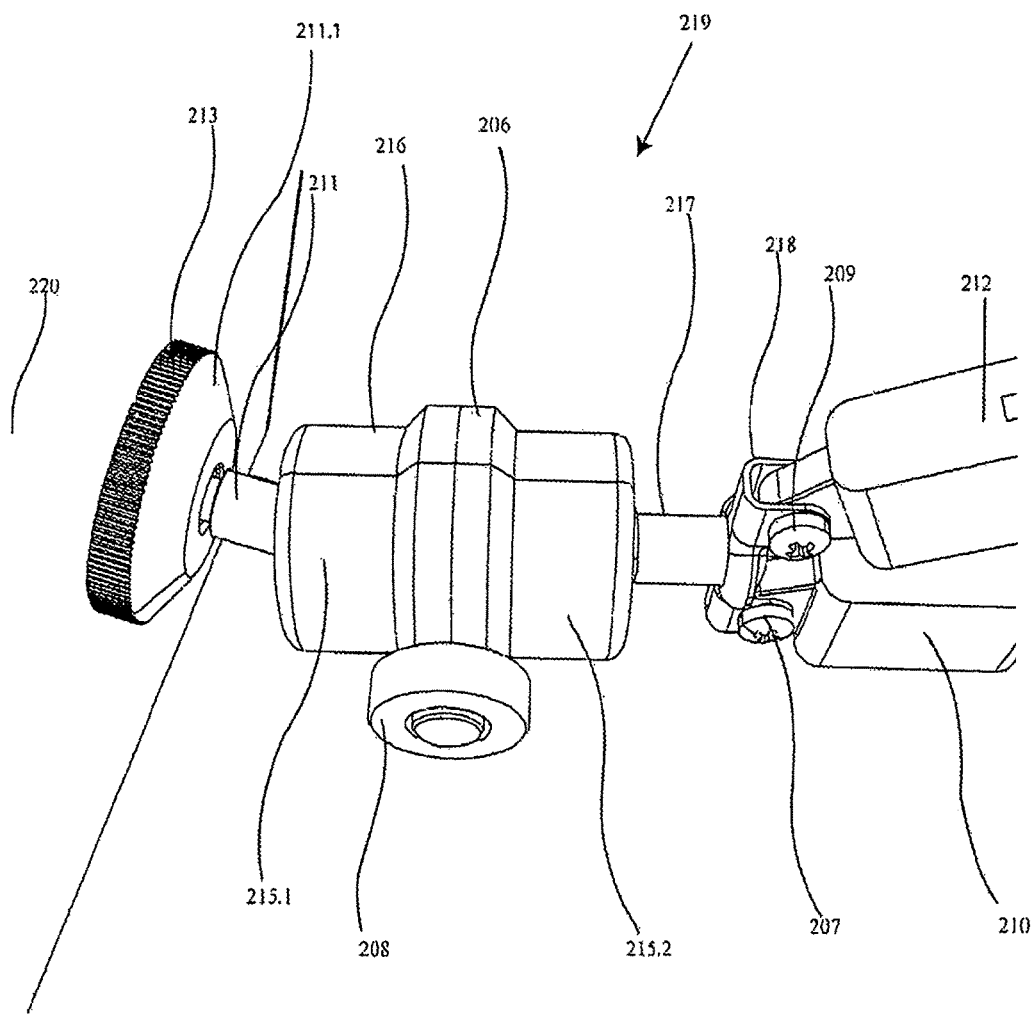
FIG. 17 shows a side view of the adjustable connector in a see-thru view.

FIG. 17 also shows a view of this adjustable section 219 in a substantially transparent view. This view shows arms 210 and 212 coupled to T connection 218.

Figure 18A:
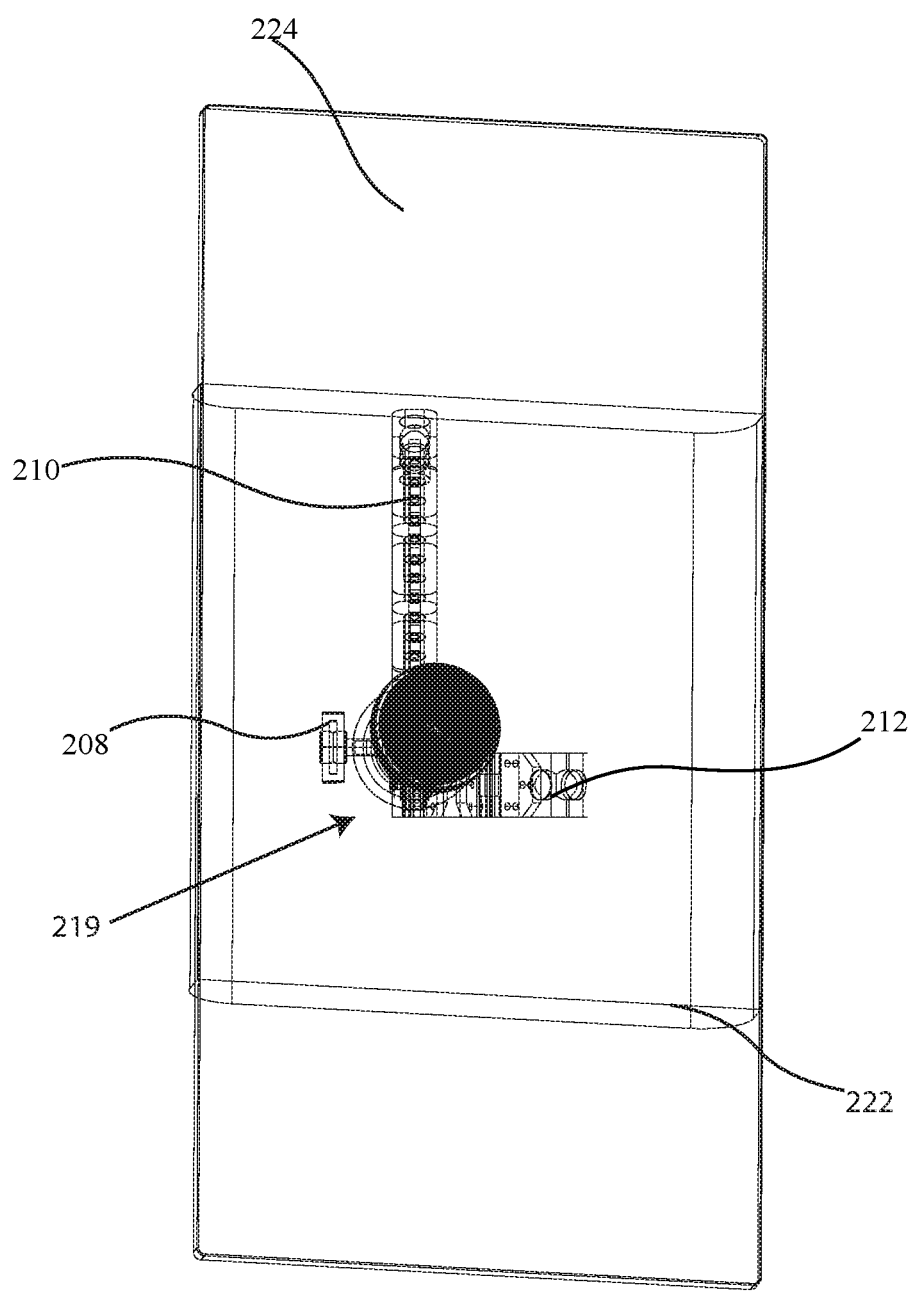
FIG. 18A is a back view of the screen.

FIG. 18A discloses arms 210 and 212 which are coupled to adjustable section 219, in which are selectively fixed in place via clamp 208. In addition, as shown in this view, there is also screen body 222, and screen display 224. This view, of course, is as a back view of screen display 224.

Figure 18B:
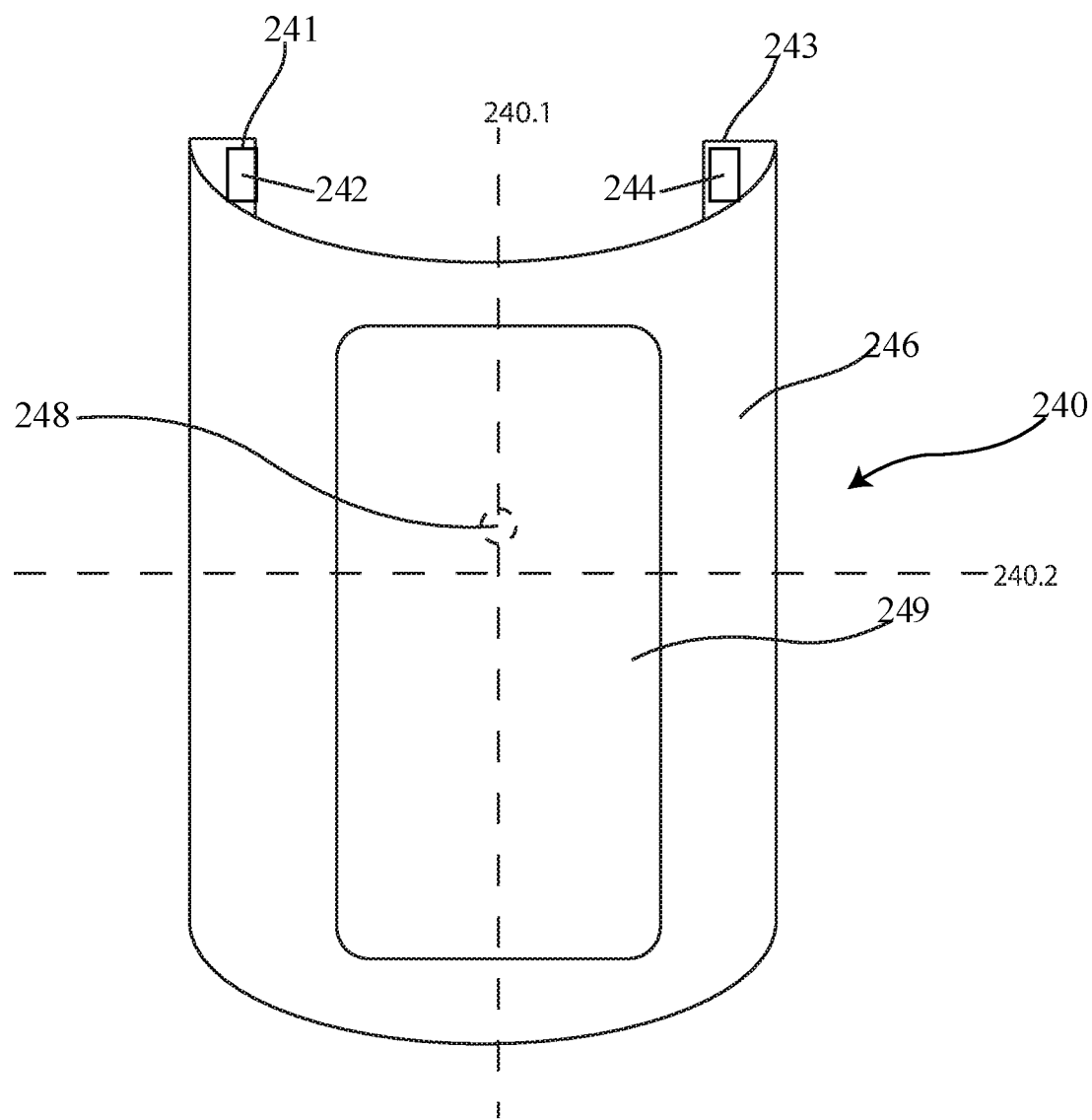
FIG. 18B is a front view of the cuff type connection of a screen.

FIG. 18B is a view of a frame type attachment for a screen. This cuff type attachment includes a body section 246 which is formed from any suitable material such as metal or plastic. The body can be made so that it is at least partially or substantially flexible so that it can be expanded and then selectively snap around a semi-circular or circular column such as a support or frame in a car or plane cockpit such as supports 14.1, 14.2, 15.1 or 15.2. The body section 246 is coupled to flanges 242 and 244 which have attachment elements 242 and 244. Attachment elements or flanges 242 and 244 comprise at least one of the following: screws, fasteners, hook and loop fastener, clips, etc. Screen 249 is coupled to body section 246. In addition a camera 248 is disposed on an opposite side of screen 249. This body section 246 is bisected via a first axis 240.1 which comprises a longitudinal axis. Longitudinal axis 240.1 bisects this body section such that screen 249 is positioned in a substantially central region. In addition this body section is substantially C-shaped or rounded so that it can fit around vertical columns or posts. Axis 240.2 is a latitudinal axis and bisects body section 246 as well. In at least one embodiment, the extension of body section 246 is longer than the extension along the latitudinal axis. Screen 249 can be used in place of any of the other screens mentioned herein and in combination with any of the other cameras mentioned herein. When the body section 246 which is made from flexible material snaps around a column or post the flanges 241, and 243 hold the body section in place.

Figure 19:
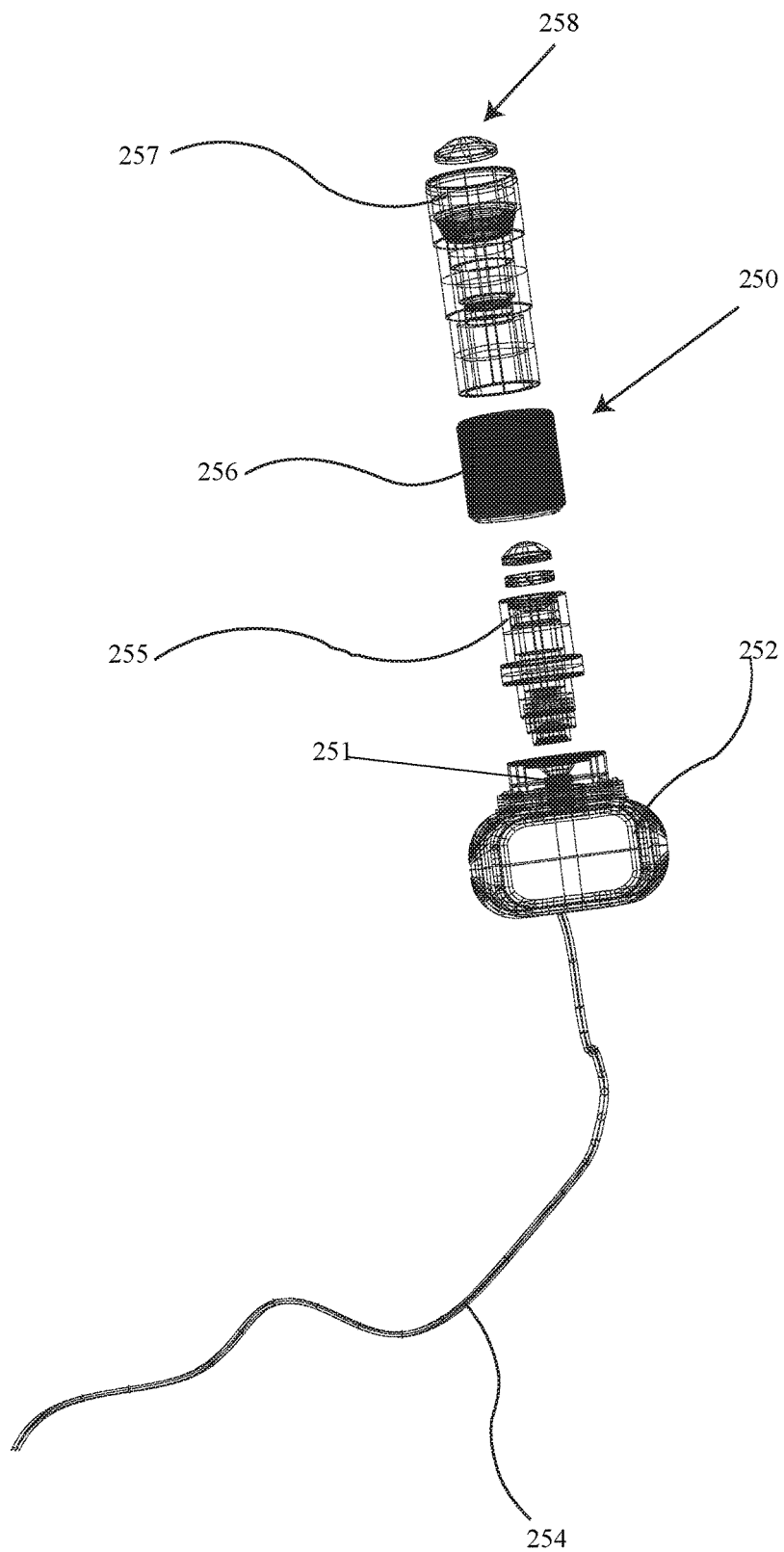
FIG. 19 is a side exploded view of a camera for use with a motor vehicle and with the screens described below.

FIG. 19 is an exploded view of a camera system 250. Camera system 250 can be coupled selectively to screen display 220. For example, in this view, there is a lens front 258, which is coupled to a second lens section 257 second lens section 257 is coupled to focal adjuster 256. Focal adjuster 256 is configured to be rotated to selectively focus the camera. In addition, there is also a first lens section 255. First lens section 255, sits in lens seat, 251. Lens seat 251 is coupled to camera body 252. Coupled to a backend of camera body is cable 254. In short, this camera system 250 includes multileveled lens sections 255 and 257. In addition, with focal adjuster 256 the camera can be focused selectively in a number of different ways. This camera can be positioned inside of the car on the rearview mirror or outside the car on the supports or on the side view mirror. Cable 254 can extend through the arm of a side view mirror. As indicated above to connect into the system components of a automobile and also to a screen such as screen 220.

Figure 20:
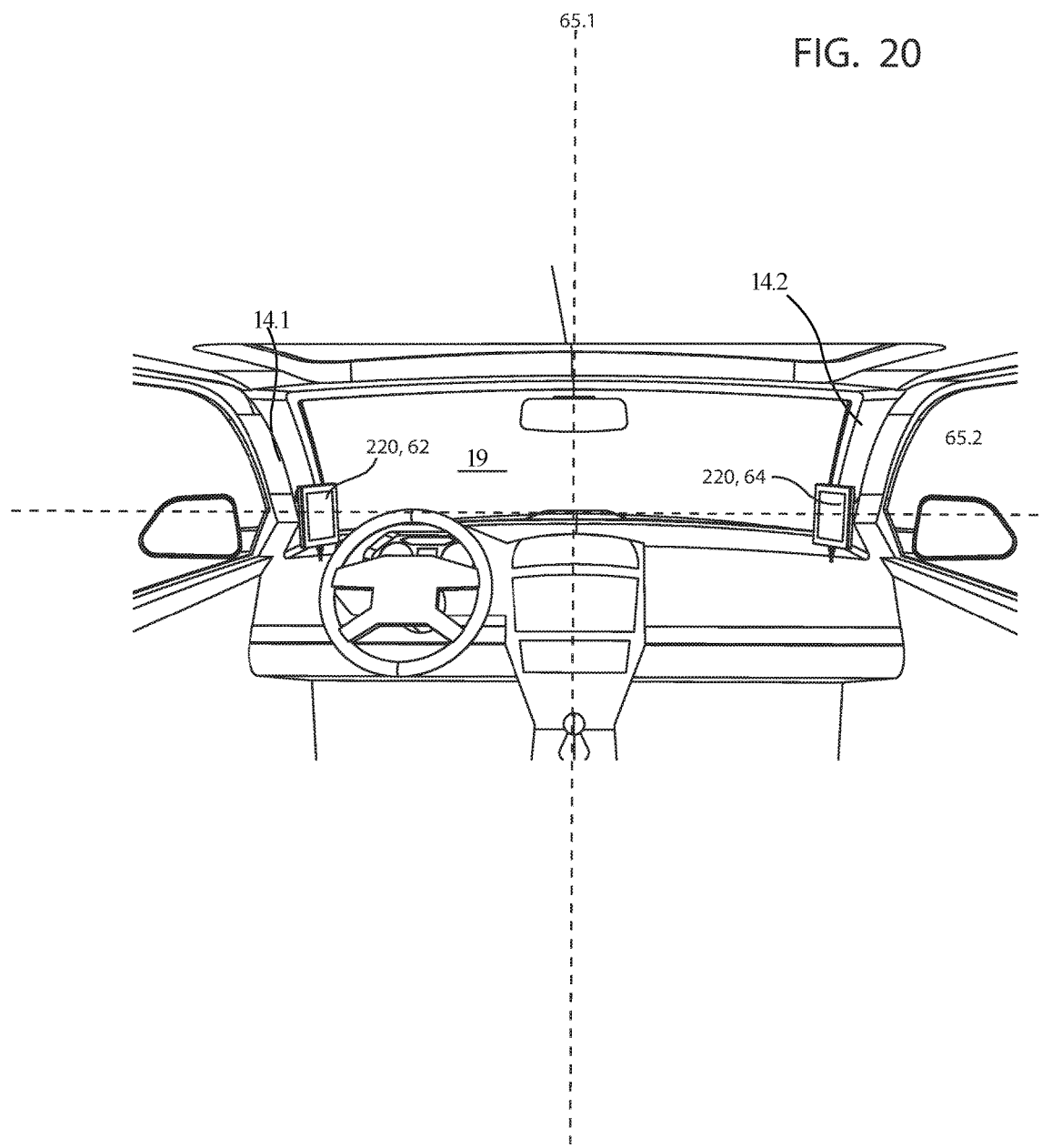
FIG. 20 is a view of an interior of an automobile having the screens installed.

FIG. 20 shows the inside of an automobile. For example, there are columns 14.1 and 14.2. Positioned along columns 14.1, 14.2 are screens 220. Screens 220 or screen 62 or 64 can be coupled to camera system 250. Alternatively, the screens can be coupled to camera 120 shown in FIG. 8.

Figure 21:
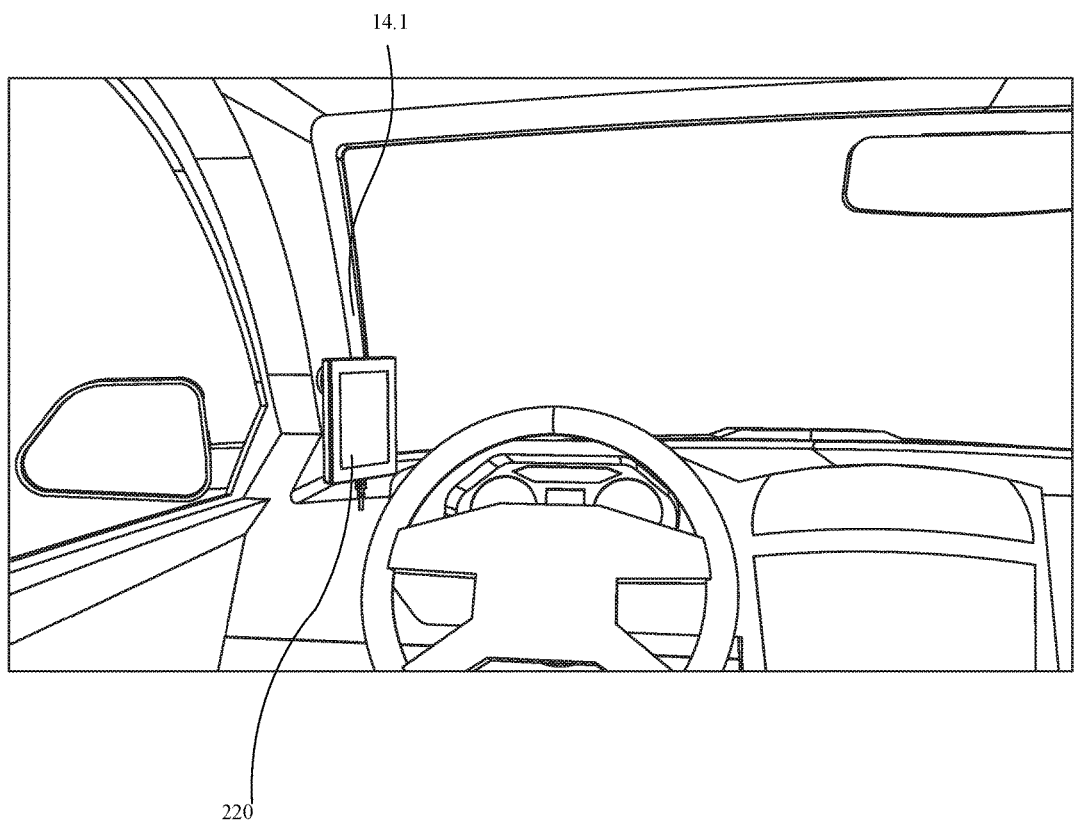
FIG. 21 is an inside view of an auto having the screens installed inside.
Figure 22:
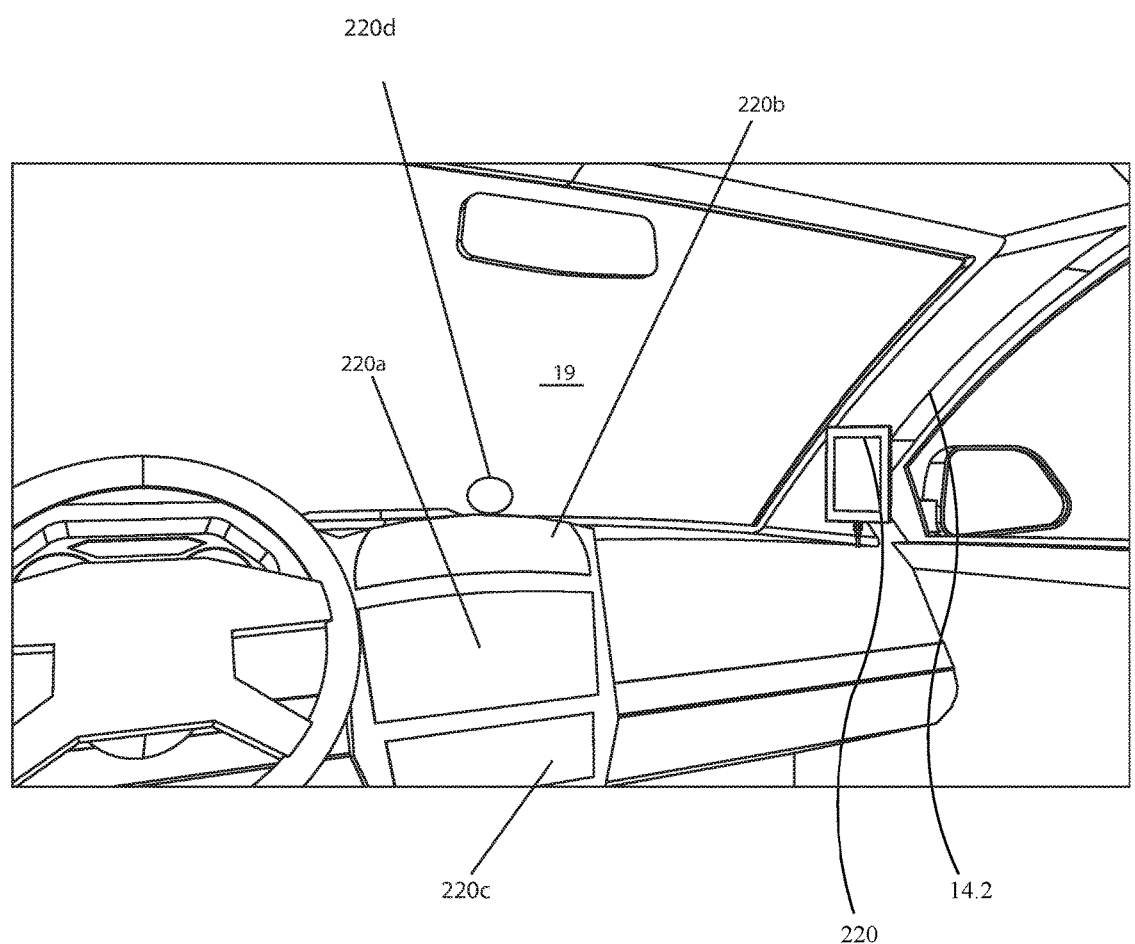
FIG. 22 is another view of an interior of an auto with the screens installed inside.

FIG. 21 shows the inside of an automobile which shows screen 220 positioned inside of column 14.1. FIG. 22 shows screen 220 positioned along column 14.2. FIG. 22 also shows a screen 220a which can be used to display one of the fields of the cameras as well. Other screens 220b or 220c can also be used. Alternatively, a projector 220d can sit on the dashboard and project an image of the view of the camera onto the windshield 19 as well.

FIG. 23 shows the outside an automobile which includes support column 14, support column 15 side windows 21 and 23 roof 16 rear support 17 and body 18.

Figure 24A:
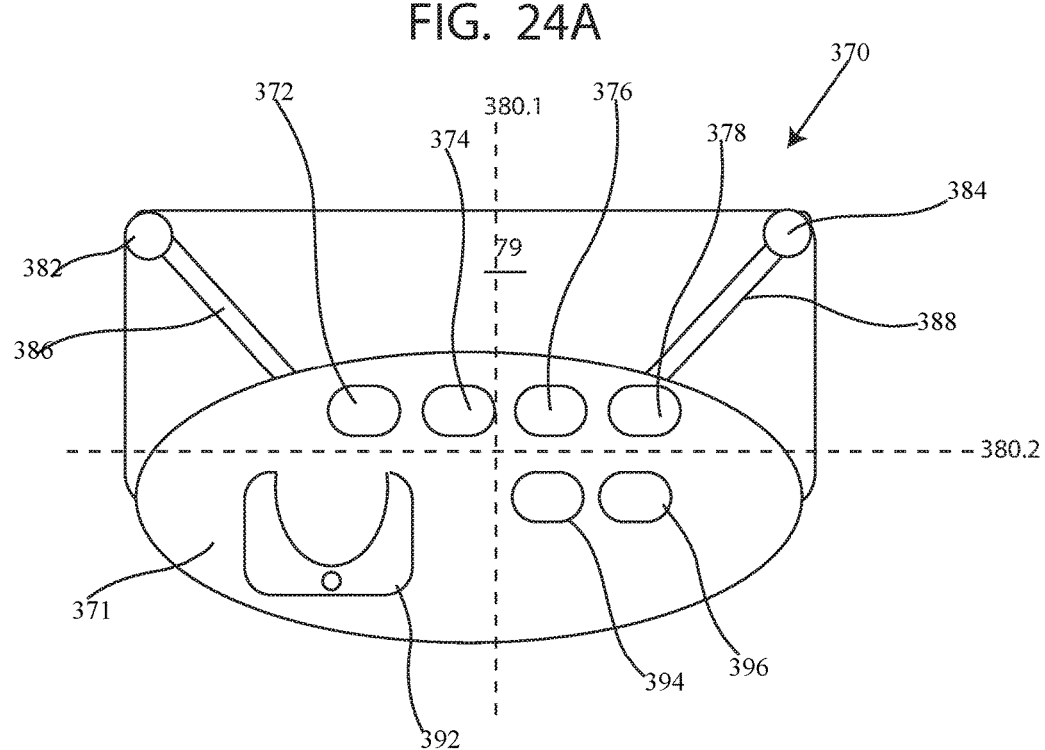
FIG. 24A is a view of a cockpit of an airplane or boat.

FIG. 24A is a view of a cockpit for a boat or a plane. In this view the cockpit design 370 includes a windshield 379, as well as screens or displays 382 and 384 mounted on supports 386 and 388 respectively. In addition, there is a front panel of a cockpit dashboard which has a steering wheel as well as a plurality of screens 372, 374, 376, 378, 384, and 396. Any one of these screens 372, 374, 378, 394, and 396 can display the information associated with cameras. In this view, there is a bisecting line 380.1 which divides the cockpit substantially in half. Thus, on either side of the bisecting line there are screens or displays 382 and 384 coupled to these supports 386 and 388. In addition these displays 382 and 384 are positioned in a top half of the cockpit as shown by the bisecting line 380.2 which divides the cockpit into two sections.

Figure 24B:
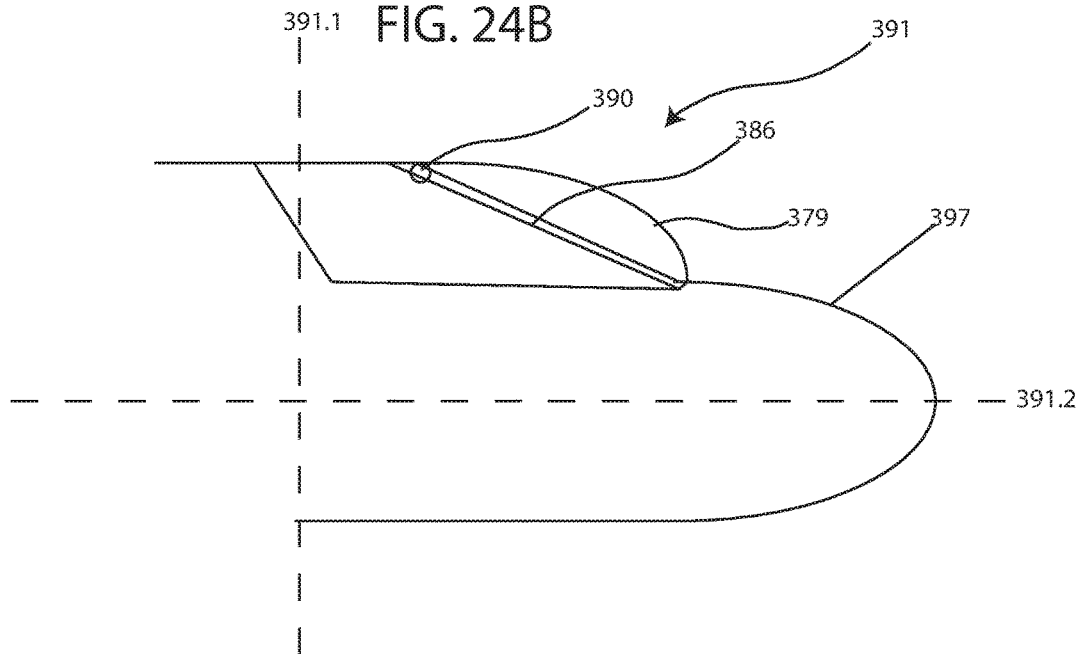
FIG. 24B is a side view of a cockpit of an airplane or boat.
Figure 25:
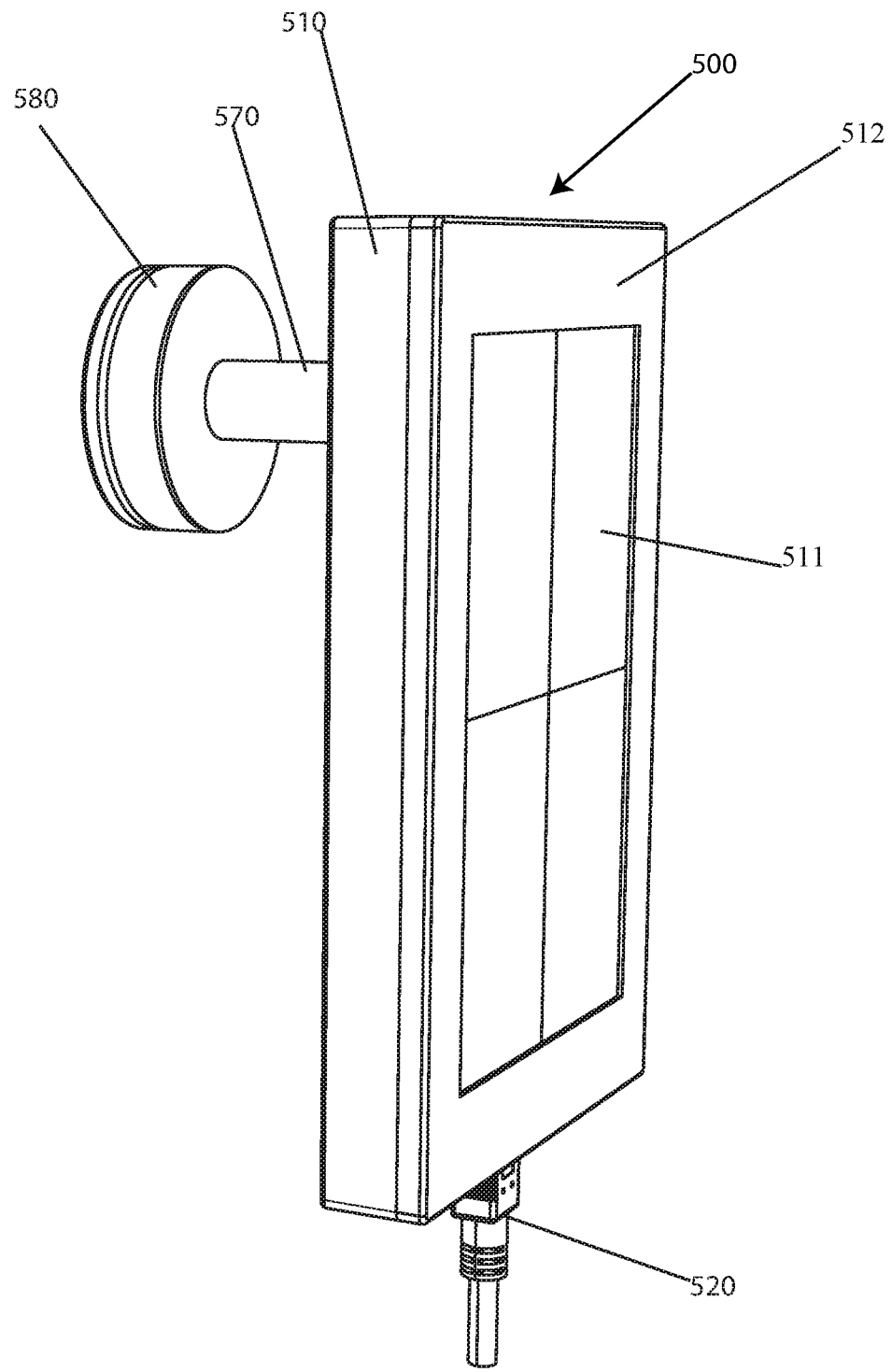
FIG. 25 is a view of a new embodiment which discloses a screen and camera combination.

FIG. 24B is a view of an outer portion of the plane 391 which has the cockpit shown in FIG. 24A. In this view there is a body 397 with a windshield 379. The body of the plane is bisected by dashed line 391.2. This view shows that camera 390 is positioned in the top half of the plane along support 386. Another opposite camera is positioned on the other support 388. While bisecting line 391.2 bisects the plane along a substantially horizontal axis, bisecting line 391.1 extends vertically and starts at the beginning region of a plane cabin which is positioned towards a front end of a plane. In this implementation all of the screens, adjusting mechanisms such as that shown in FIGS. 11-17, FIG. 25 discloses a new embodiment 500 which includes a screen assembly 510, a camera assembly 580, and a channel 570 connecting the camera assembly 580 with the screen assembly 510. Screen assembly 510 includes at least a screen body or housing 512, and a screen itself 511. Screen 511, is housed inside of screen body 512. Behind screen 511, are electronic components shown in FIG. 36. A cable 520 can be coupled to screen assembly 510 through a port not shown herein.

Thus, with this design, camera assembly 580 can be positioned on one side of a support such as supports 14.1 14.2, 15.1, 15.2 while the screen assembly 510 can be positioned on the opposite side of the support 14.1 14.2, 15.1, 15.2. Channel 570 then extends through the door to bridge between the two assemblies.

Figure 26:
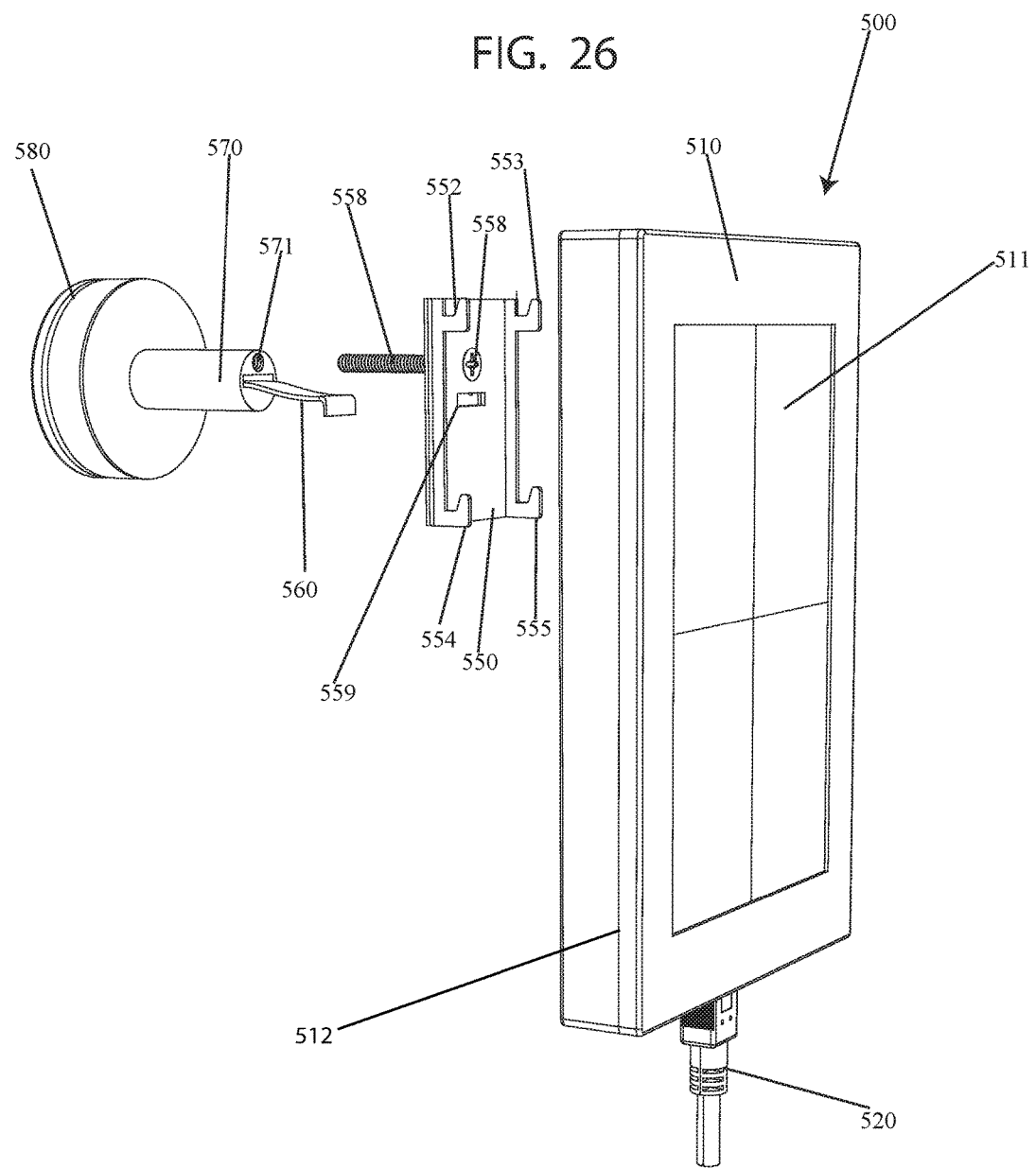
FIG. 26 shows a side exploded view of the screen and camera combination.
Figure 29:
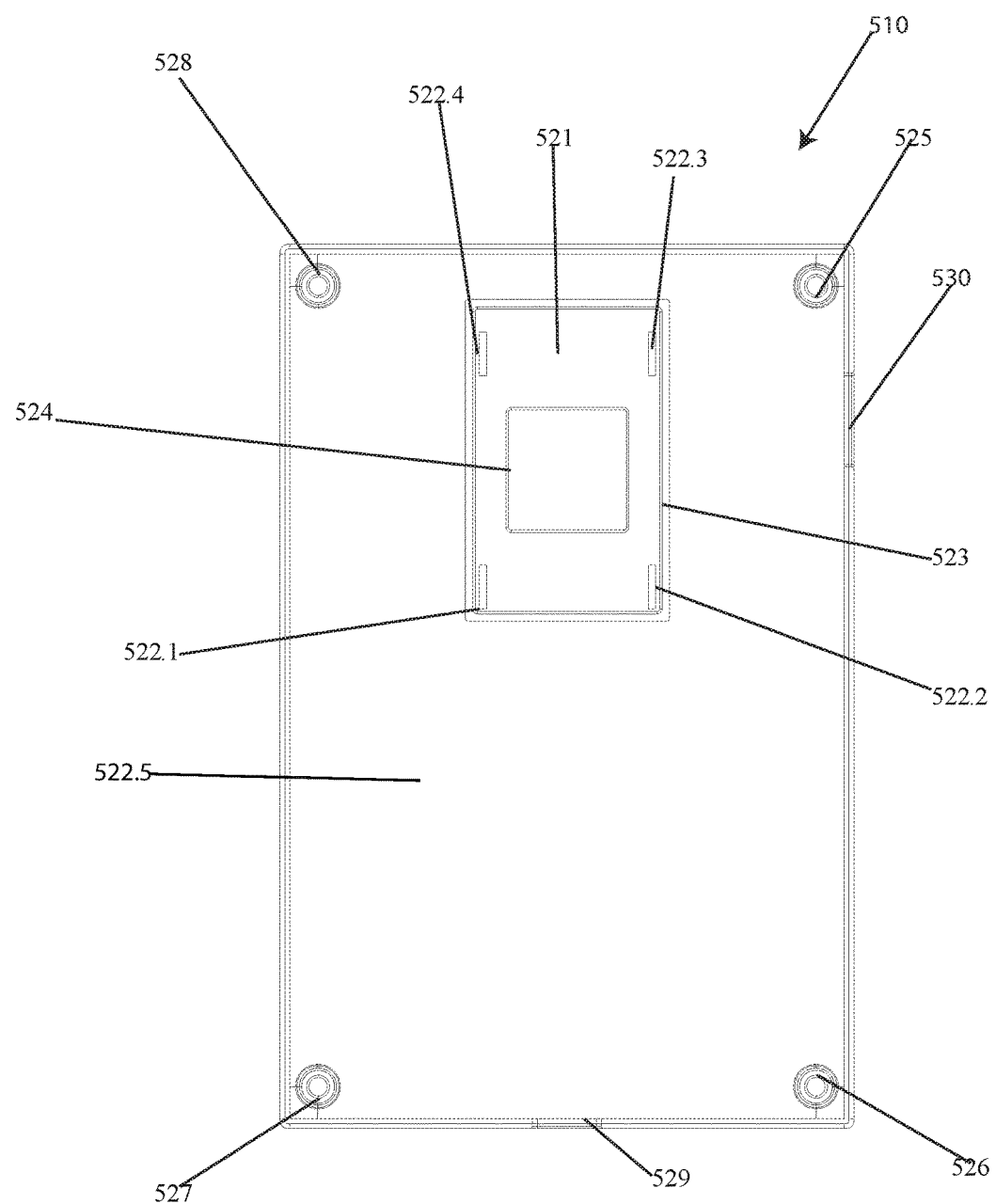
FIG. 29 shows a back view of the screen.

FIG. 26 shows a side perspective exploded view of the device shown in FIG. 29. For example, in with this embodiment 500, there is shown screen assembly 510 with screen 511 disposed inside of screen housing 512. As with FIG. 29, there is a cable 520 coupled to a bottom section of the screen. A coupling or support bracket 550 includes a bracket body, as well as at least four different bracket prongs 552, 553, 554, and 555. These bracket prongs extend out from the bracket body that are formed as substantially L-shaped hooks.

Figure 31:
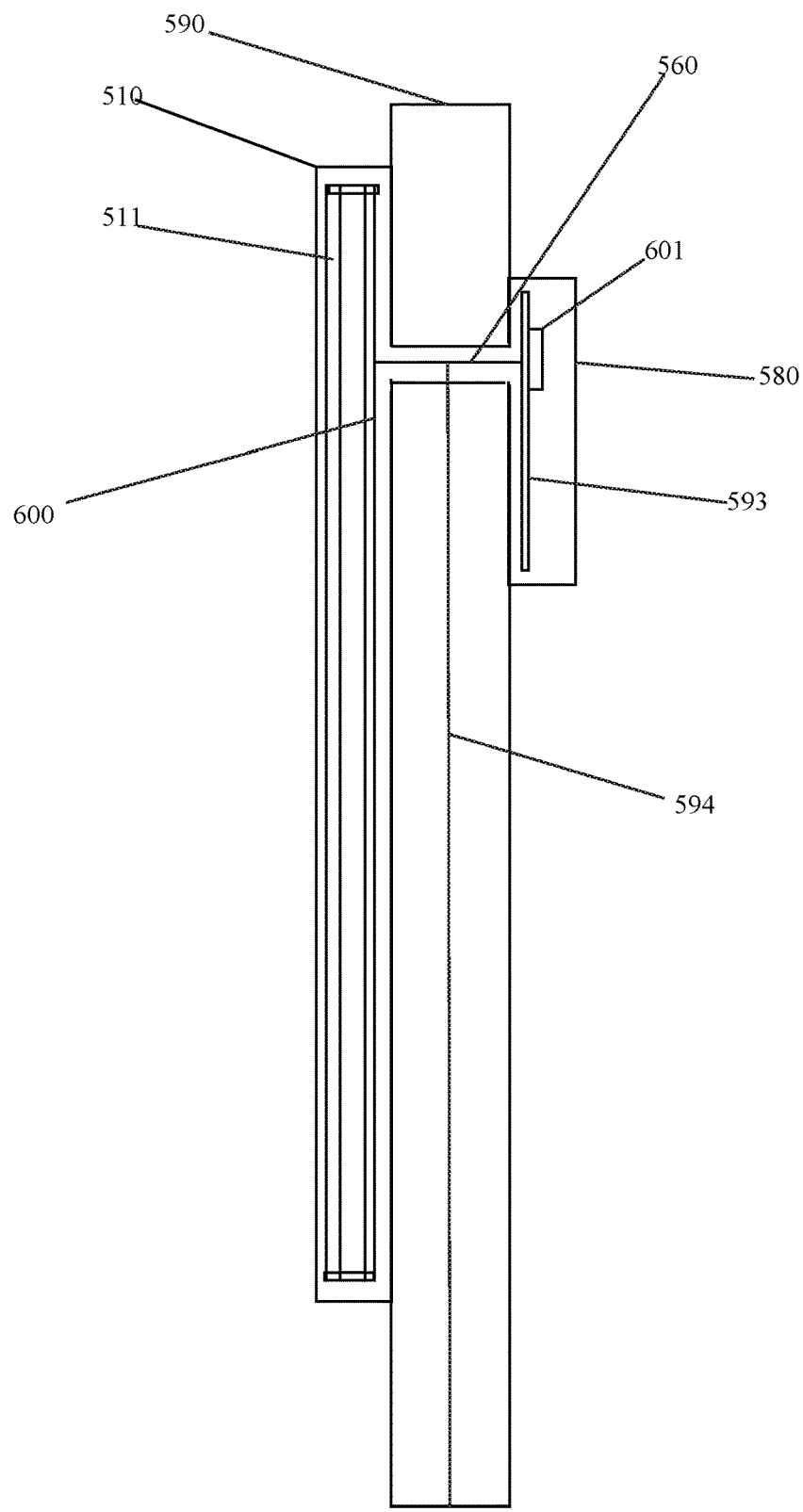
FIG. 31 shows a side cross-sectional view of a screen and camera combination with internal wiring.

These substantially L-shaped hooks are configured to hook inside of a back face of the screen body. In addition, a screw 558 is coupled to coupling bracket 550. In addition, disposed inside of coupling bracket 550 is a cable slot 559. Cable slot 559 is configured to receive a cable 560. Cable 560 is configured to be coupled to the electronic components shown in greater detail in FIG. 36. Cable 560 extends inside of channel 570 all the way to camera assembly 580. A screw hole 571 in channel 570 is configured to receive screw 558. Thus, cable 560 can slide through cable slot 559, wherein cable 560 is then connected to the electronic components inside of the screen body 512 of screen assembly 510. In addition, screw 558 can be screwed into screwhole 571 to secure camera assembly 580 connection bracket 550. Connection bracket 550, can then be coupled to screen body 512 as shown in FIG. 31.

Figure 27:
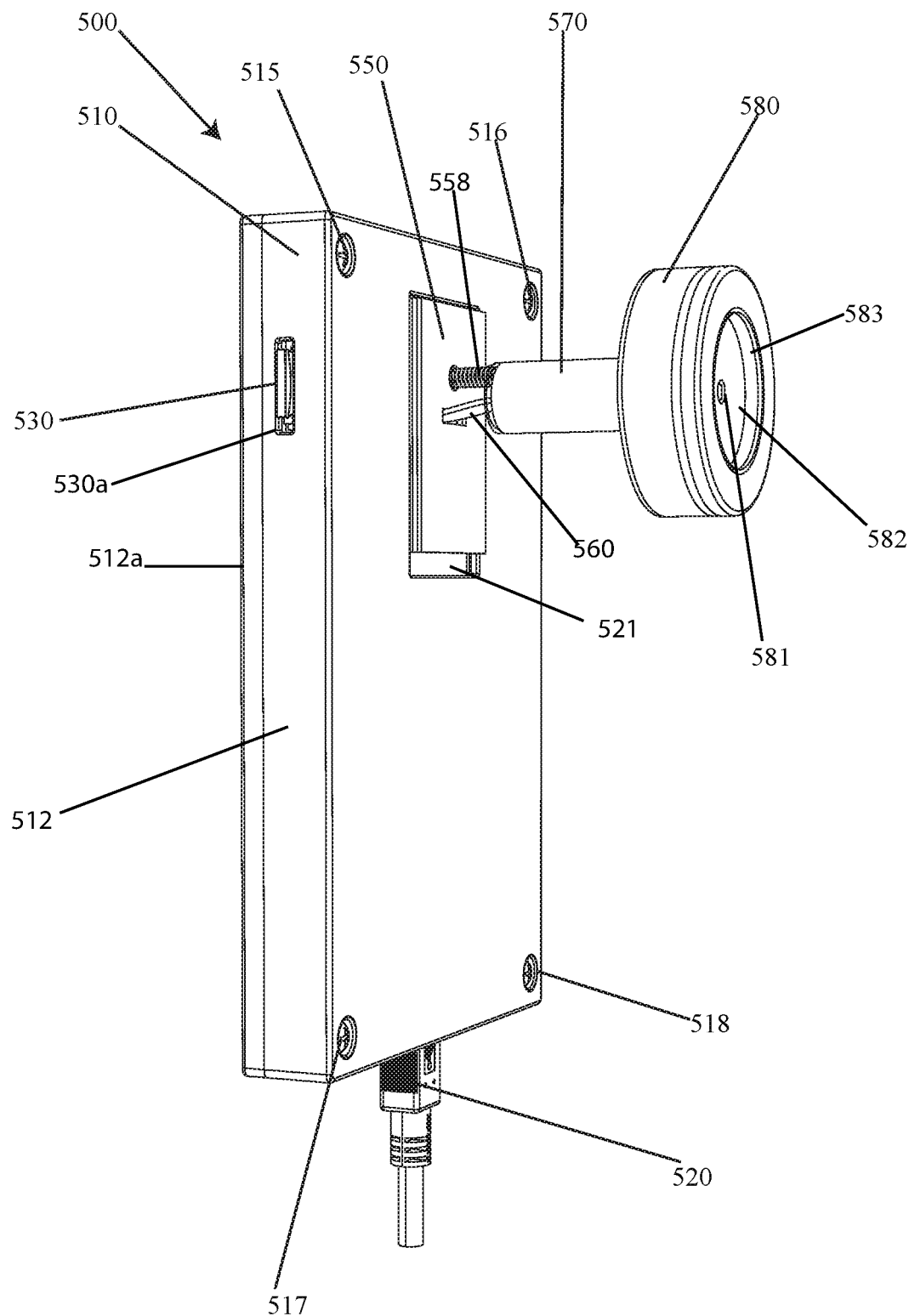
FIG. 27 shows a back perspective view of a screen and camera combination.

FIG. 27 shows a side-back perspective view of the embodiment shown in FIG. 29. In this view, connection bracket 550 is shown fitting into slot or recessed receptacle 521. As shown in this view, channel 570 is shown extending from camera assembly 580. Camera assembly 580 includes a camera 581, a camera face 582 and side walls 583. Camera assembly 580 can also include a covering such as a glass or transparent covering. As shown, there is also a screw 558 that connects channel 570 to bracket 550. In addition as shown, there are also backing screws 515, 516, 517, and 518 which connect the body or housing 512 to a front plate 512a. In addition, as shown, there is a card 530 which extends into an opening 530a which connects card 530 to the motherboard which is housed inside of housing 512. The connection bracket 550 is fit snugly inside of recessed receptacle 521.

Figure 28:
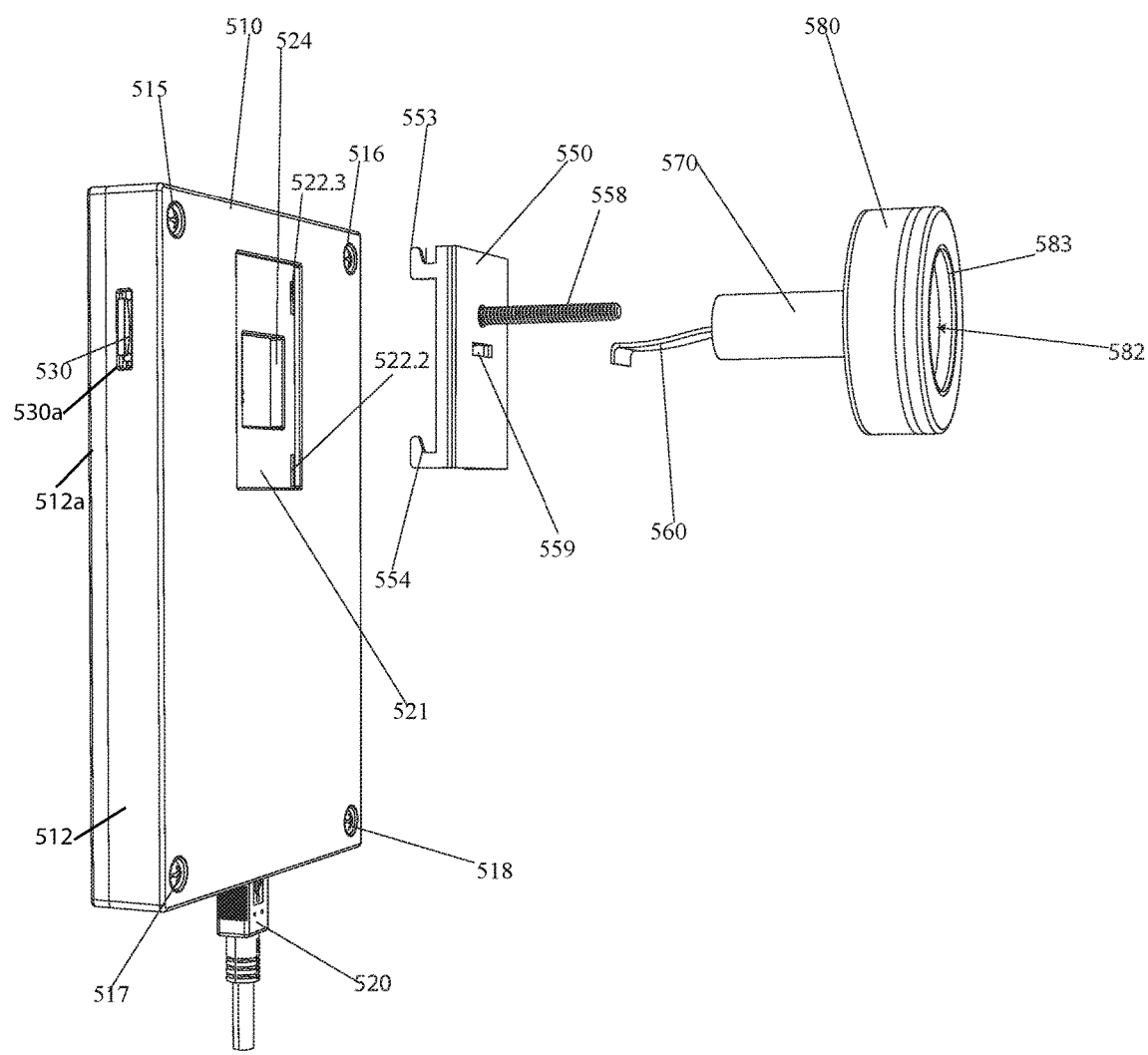
FIG. 28 shows a back perspective view of a screen and camera combination in an exploded view.

FIG. 28 is a side exploded view which is similar structure shown in FIG. 27. In this view there is shown bracket 550 is shown removed from screen body 512. Prongs 554, and 553 are shown extending out from bracket 550 wherein these prongs 551, 552, 553, and 554 can be configured to extend into prong openings such as prong openings 522.1, 522.2, 522.3, and 522.4. Cable 560 can extend in through slot 559 and then extend through opening 524.

FIG. 29 is a back view of the screen assembly 510. In this view, there are screw holes 525, 526, 527, and 528. There are prong openings 522.1, 522.2, 522.3 and 522.4 which are configured to receive prongs. In addition, opening 524 is also shown. Furthermore, opening 529 is also configured to receive a cable 520. Cable 520 can be in the form of a power and communications cable such as a power over Ethernet cable (POE) which can supply both power and communications to and from a screen/camera and back to a central on board computer such as that shown in FIG. 38.

Figure 30:
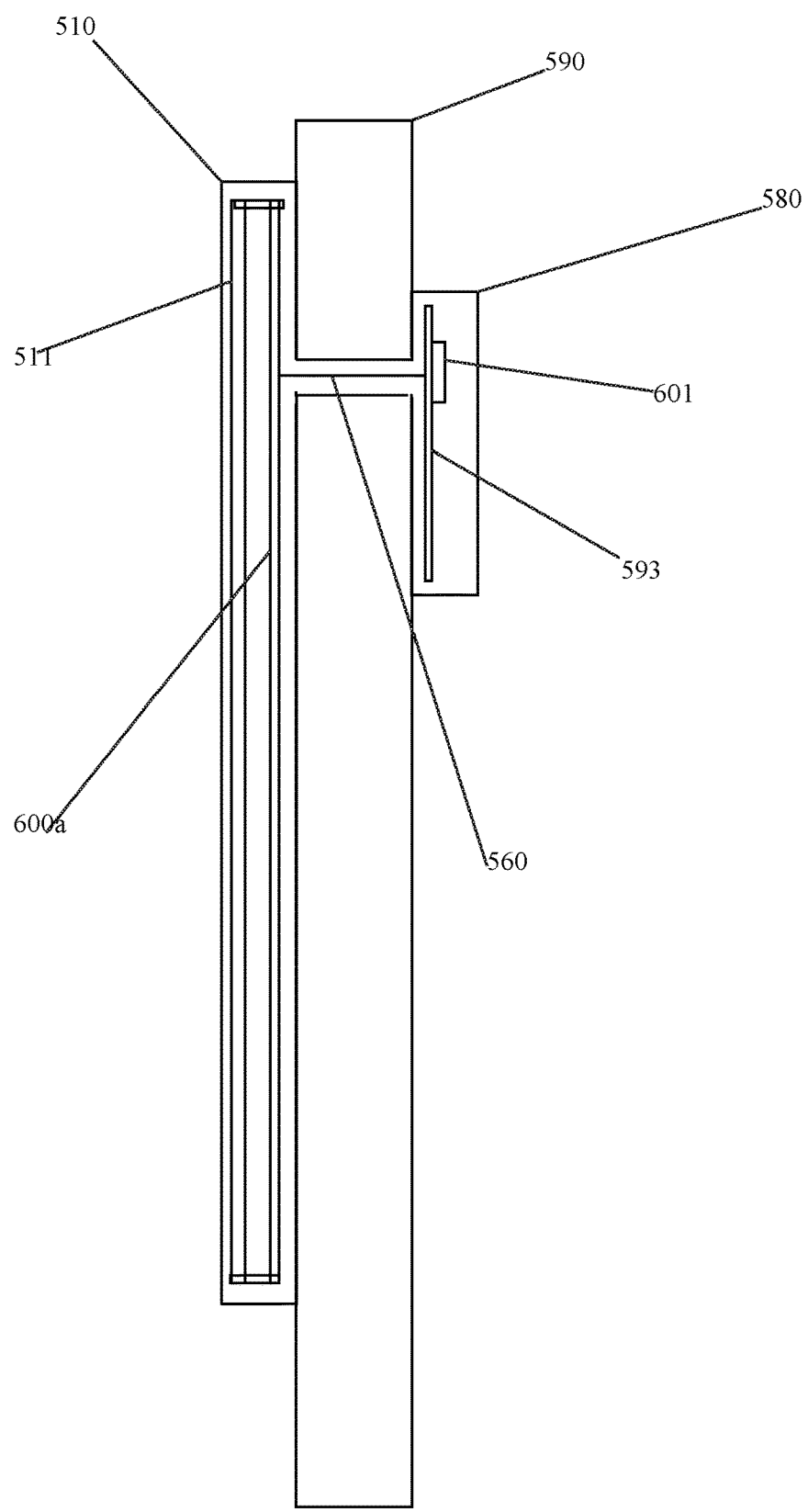
FIG. 30 shows a side cross-sectional view of a screen and camera combination.

FIG. 30 shows a side cross-sectional view of the system as it is coupled to a post in a car frame such as post 14, 15 or post 590. Post 590 can be any type of post similar to the posts 14.1, 14.2, 15.1 and 15.2. In addition post 590 can also represent the surface of a rear view mirror or side view mirror as well. In this view there is a screen 511 disposed inside of a screen housing 510. In addition, there is a motherboard 600a which is in communication with screen 611. A cable or line 560 is in communication with motherboard 600 and extends to camera motherboard 593 disposed inside of a camera 580. Three is also a camera chip 601 disposed inside of camera housing 580.

FIG. 31 shows another embodiment which shows the same components of FIG. 30 however it includes an additional line 594 forming a power line for powering the components. This power line can be used as a feed for feeding the power from the auto such as through an automobile electrical system.

Figure 32:
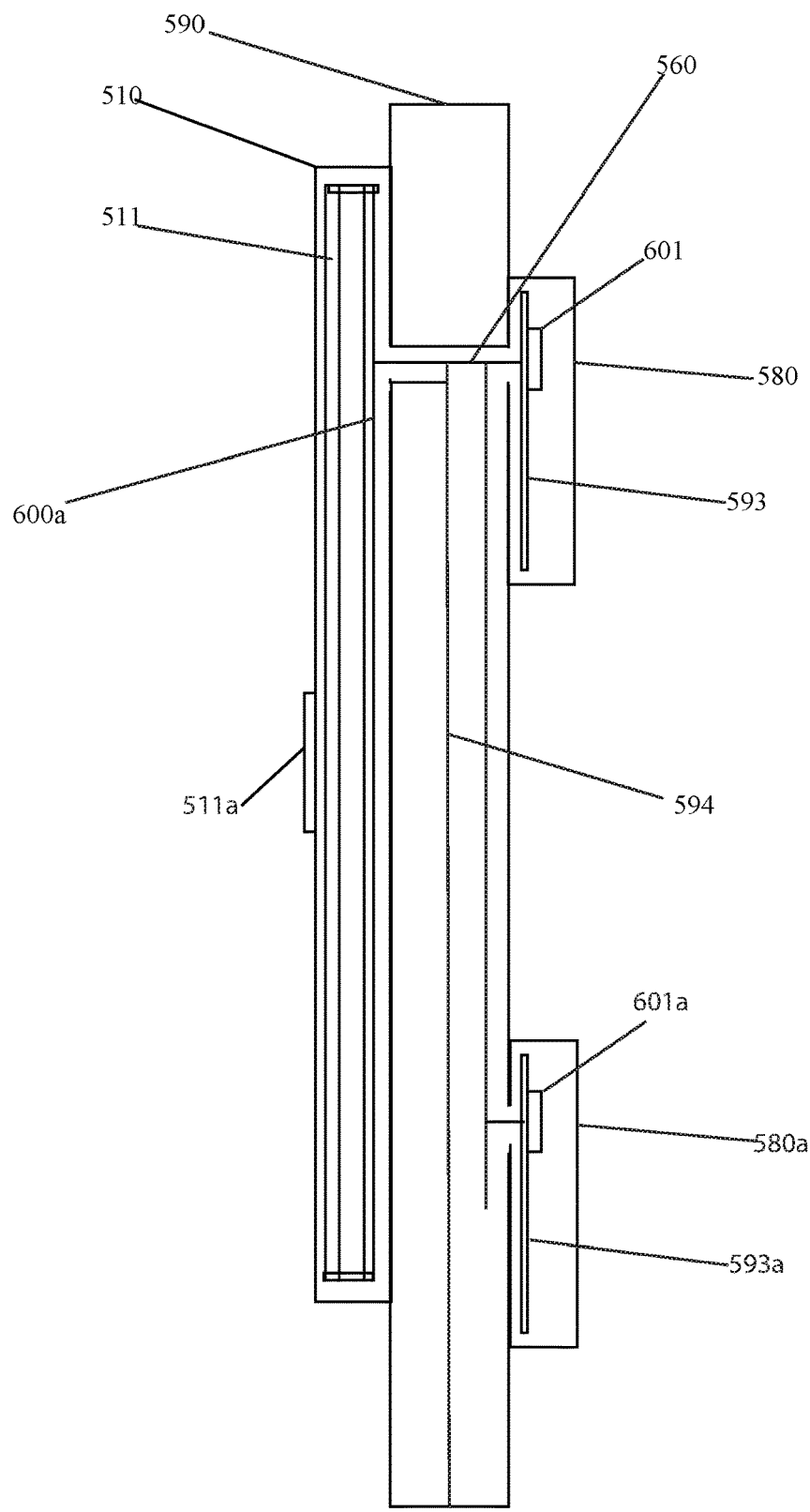
FIG. 32 shows a side view of a screen and camera combination with multiple cameras for a single screen.

FIG. 32 shows a side view of a multiple camera installation which is similar to FIG. 31, however this embodiment includes an additional line 594, an additional camera housing 580a, a base motherboard 593a, and an additional camera chip 601a. Thus, with this design multiple cameras can be associated with a single screen. The single screen can include at least one button, either included in a touch screen or an additional button 511a which can serve as a toggle button for the device toggling between different cameras. Alternatively, the two or more cameras can serve as a means for creating a three dimensional view on the screen 510. In addition, these buttons or virtual buttons as part of the screen software which are presented on the screen itself can be used to point and aim the cameras such as cameras 580, 580a, 580b, 580c, which are all cameras configured to be electronically driven, as well as at least cameras 22, 24, 26, and 32, 34, 36, 100, 120 by any suitable means such as through the drive system shown in FIG. 10B.

Figure 33:
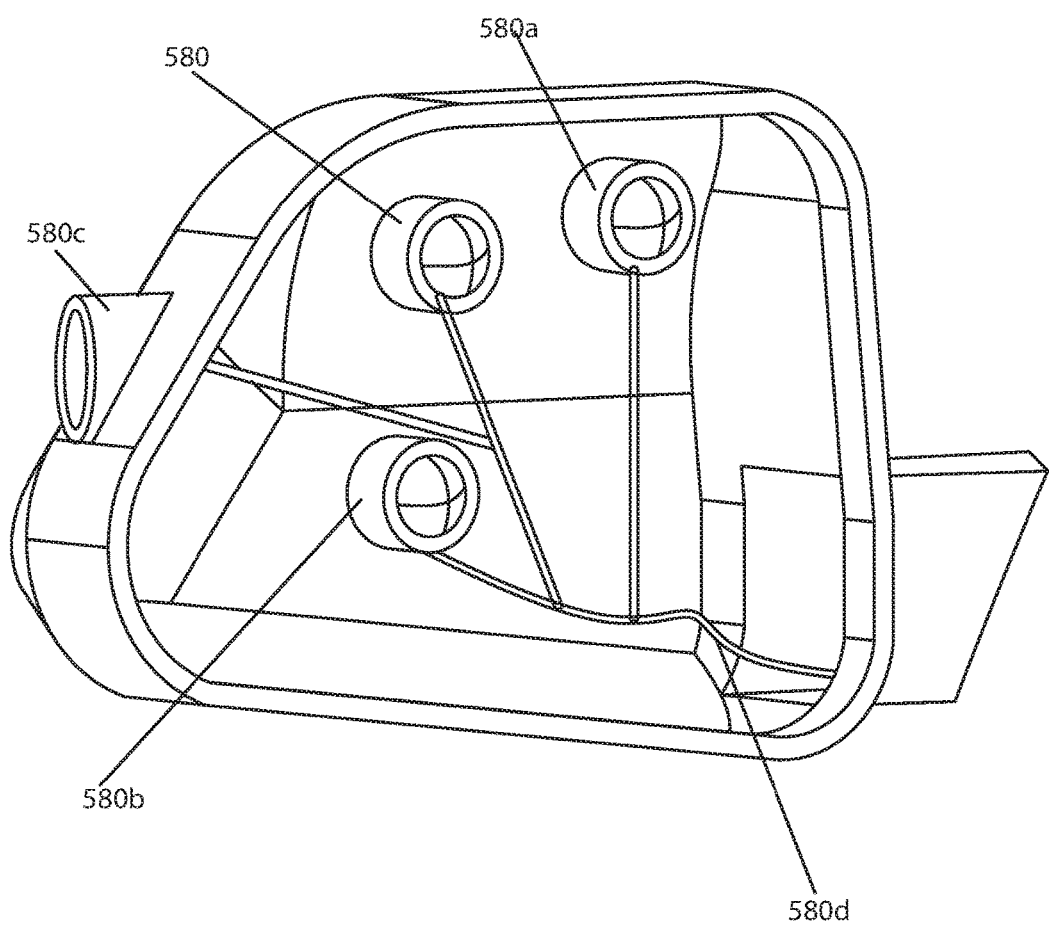
FIG. 33 is a front view of a camera and mirror combination with multiple cameras installed on a side mirror of an automobile.

FIG. 33 shows the different cameras which can be installed for example on a side view mirror 122. There can be for example a first camera or camera body 580, a second camera or camera body 580a, a third camera or camera body 580b, and a fourth camera or camera body 580c. While the cameras can be in the form of multiple different cameras feeding into a single screen, at least one of the cameras such as camera 580c can be positioned at a side position on mirror 122 so that it extends the viewing out laterally for users to see to the side of the car and even into blindspots of a rear view mirror. These cameras can also be driven such as via the drive system shown in FIG. 10B.

Figure 34:
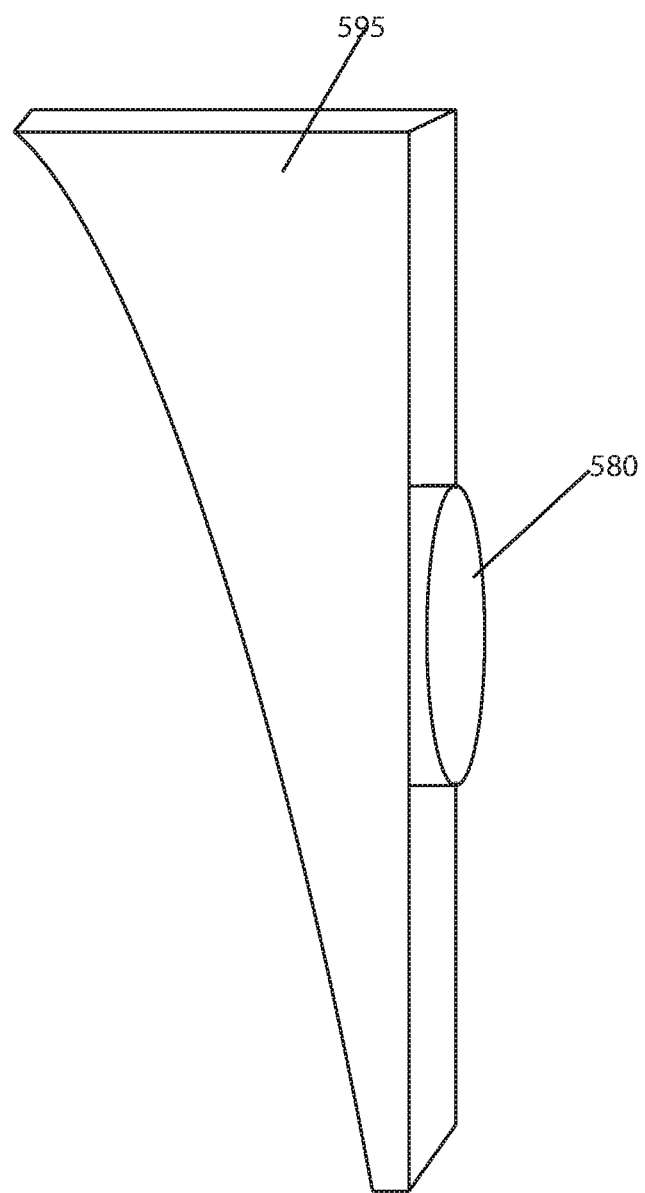
FIG. 34 is a side view of an adapter which can be placed on a side of a support for an auto or on a mirror.

FIG. 34 is a side perspective view of an adapter which includes a block adapter forming a mounting bracket 595 which can be pre-molded and pre-formed into a particular shape or structure which then allows the existing curvature of a structure of the automobile to be compensated for via this structure. Coupled to this block adapter 595 is a camera body 580 which is seated inside of this adapter structure. Any type of combination of camera and screen system can be used herein with this adapter.

Figure 35:
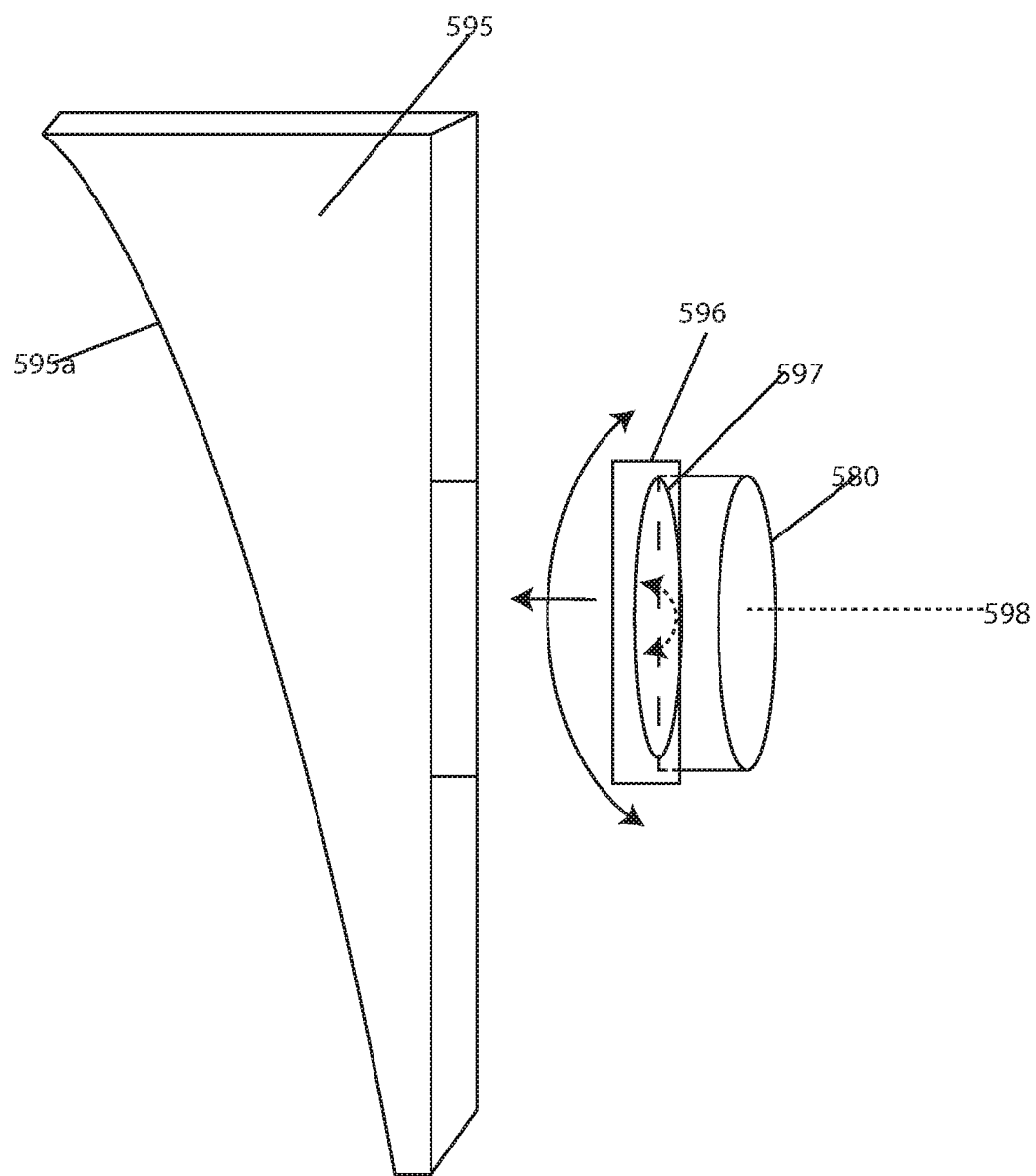
FIG. 35 shows a side support which allows for a camera with an adjustable angle seat being insertable therein.

FIG. 35 is a side perspective view of the block 595 which is configured to receive the camera body 580. With this embodiment, there is a camera seat 596 which includes an adapter device 597 which allows the camera to be rotated relative to a horizontal axis 598 to position and point the camera inside of the camera body. The camera seat 596 can be adjusted or rotated to either loosen or tighten the adapter device 597 to allow for the camera to be selectively positioned at a particular angle. With this design there is at least one curved surface 595a positioned substantially opposite a surface supporting the camera 580. Alternatively the drive mechanism shown in FIG. 10B can be used with this type camera as well.

Figure 36:
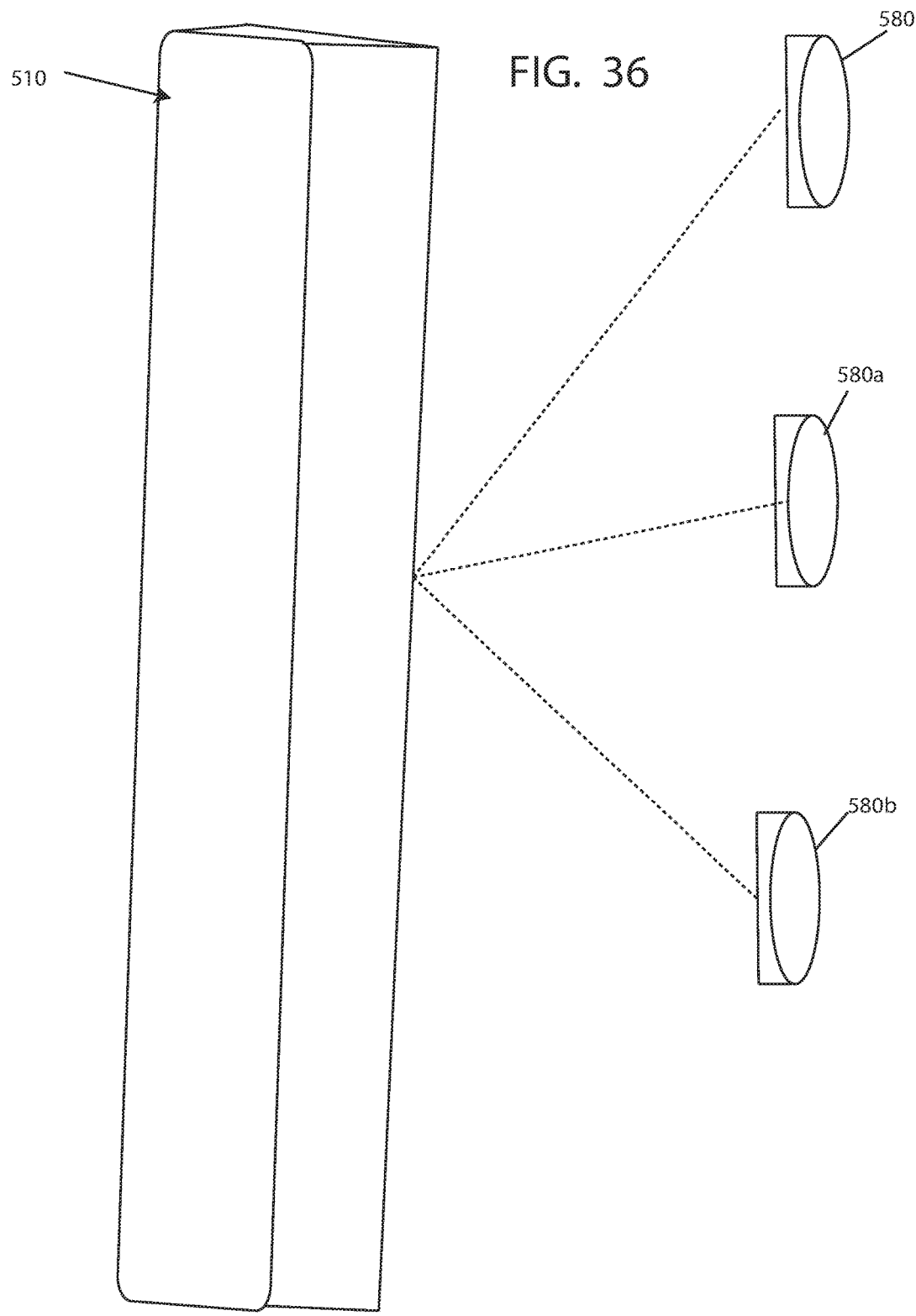
FIG. 36 shows a screen and multi-camera installation.

FIG. 36 shows a screen 510 which can be connected to any one of cameras 580, 580a, and 580b through a wireless connection.

Figure 37:
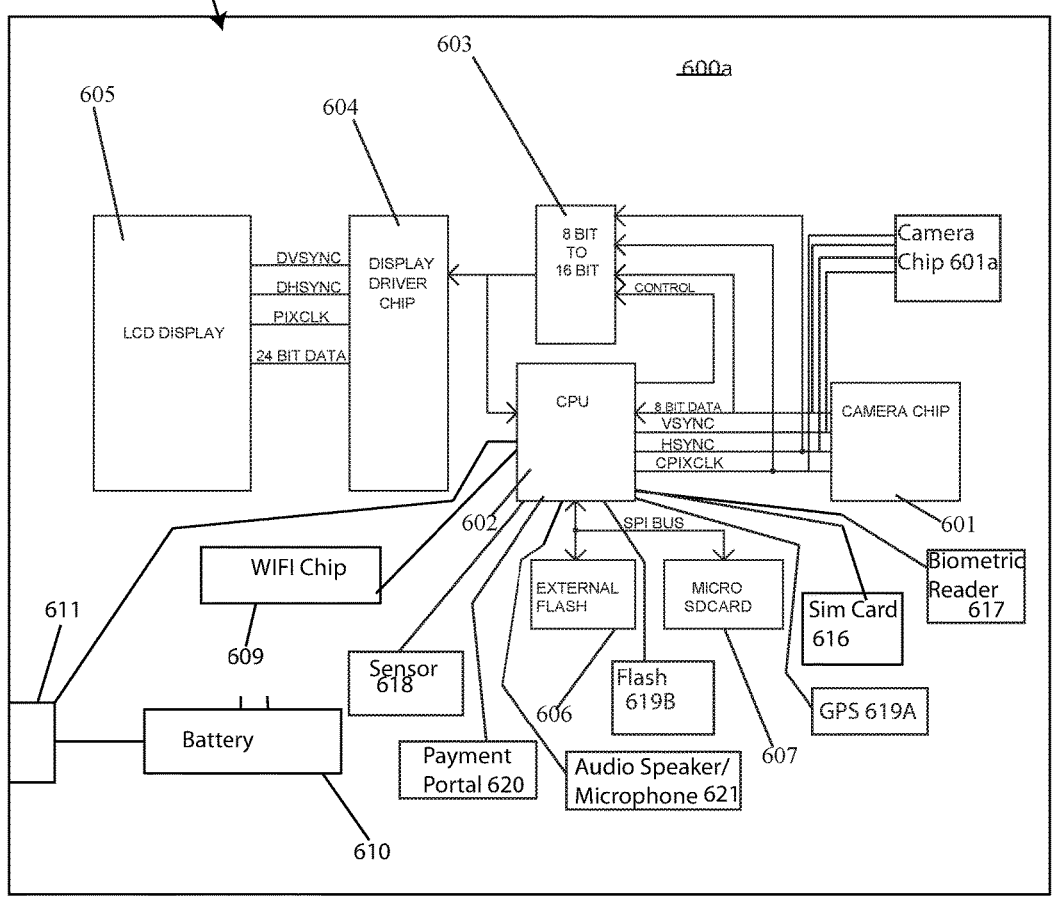
FIG. 37 is a schematic block diagram of the electronic components for the screen and camera combination.

FIG. 37 shows the preferred embodiment of the apparatus. This embodiment of electronic components 600 includes camera chip 601, CPU 602, data converter 603, display driver chip 604, LCD display 605, flash chip 606 and micro SDCard 607 which can include 530 shown in FIG. 31.

Camera chip 601 is one of several types. In the current embodiment, the chip provides an integrated lens, 640×480 full color pixel array sensor or any other suitable resolution, control electronics, an 8 bit data output bus and a control bus. CPU 602 sends commands to the camera chip to initialize it and to control the capture and format of data.

Typically, one of several formats can be chosen for the representation of full color images. CPU 602 selects a format that is compatible with display driver 604 to reduce the amount and convolution of data required to display a good image.

Data from the camera chip is ported to both CPU 602 and to the display driver chip 604, via data converter 603. The display driver 604 can accept data in several widths (8 bit, 16 bit, 24 bit) and formats (RGB656, RGB888, etc). The current embodiment programs camera chip 601 to send image data in the RGB656 format, which consists of 2 bytes containing 5 bits of red color information, 6 bits of green color information and 5 bits of blue color information. Display driver 604 can accept this data in 16 bit format; since the camera chip outputs the data in 8 bit widths, data converter 603 is used to convert the 8 bit data into 16 bit RGB656 format data. Display driver 604 contains sufficient memory to store at least one frame of display data.

The display driver 604 has many registers to control the appearance of the LCD display 605, so it is connected to CPU 602 using the same bus as data converter 603. CPU 602 programs these registers before beginning the image display and also writes a command to display driver 604 at the start of every display frame to describe where the forthcoming data from data converter 603 is to be displayed on LCD display 605.

A frame of data is defined by signals VSYNC and HSYNC and CPIXCLK. VSYNC is set high when an image frame is to be output from camera chip 601. Each line of the image is qualified by HSYNC which goes high when valid pixel data is available on the data outputs of camera chip

601. HSYNC goes low when the line of data ends and signals that a new line of data is about to begin. CPIXCLK pulse high frq each byte of data sent by camera chip 601. CPU 602 can either accept this data (to save frame(s) to micro SDCard 607, or can send this data to display driver chip 604 via data converter 603.

The sequence of events required to capture and display an image frame is this: CPU 602 monitors signal VSYNC from camera chip 601. When VSYNC is detected high by CPU 602, CPU 602 programs display driver 604 with the addresses of the data that is to be written to the LCD display. Once this is programmed CPU 602 activates data converter 603. Data converter 603 accepts HSYNC and CPIXCLK and uses these signals, along with the data signals from the camera chip to assemble a 16 bit wide RGB656 word and subsequently write that word to display driver chip 604. Display driver chip 604 takes these RGB656 and stores them sequentially into its internal frame memory. Display driver chip 604 uses the frame memory to generate the signals DVSYNC, DHSYNC, PIXCLK and the 24 bit data (8 bits each of red, green and blue) for display on LCD display 605.

CPU 602 continues to monitor signal VSYNC from camera chip 601. When VSYNC goes low, the frame has been completed and CPU 602 turns the data converter off and begins looking for a new frame of data. When CPU 602 sees VSYNC go high again it starts the display sequence again. This provides full motion data from the camera to be displayed on the LCD display 605.

LCD Display 605 incorporates a touch screen interface for the apparatus. This interface permits the user to capture an image or a video from the camera chip to micro SDCard 607. This image can be used for identification or verification of events. Flash chip 606 holds images that can be displayed on a portion of LCD display 605 and includes virtual buttons, help instructions, or general information for the operation of the apparatus. CPU 602 can generate information that can be displayed on LCD screen 605 instead of video or as an adjunct to the video display. In addition coupled to CPU are other optional components.

For example the optional components include a WIFI chip 609 which can be used to allow the camera and CPU 602 communicate with another computer network. In addition there can be a battery 610. There is also an Ethernet connection port 611 which is coupled to CPU 602. Other optional components can include a sensor 618. Sensor 618 can be any one of the following sensors: RFID sensor, a motion sensor, a door ajar sensor, a fingerprint scanner, a thermal sensor, and a proximity sensor alarm. In addition there is also shown a sim card 616, and a biometric reader 617. There can also be an audio speaker or a microphone 621 wherein the users can communicate between each other by communicating using the audio speaker and a corresponding microphone. This audio speaker and microphone can be embedded into the screen assembly 510. There can also be a GPS system 619A which can be used to receive and communicate with GPS systems to provide a location for the automobile or moving vehicle. The electronics shown in FIG. 37 can be used in any one of the camera and screen combinations disclosed herein.

Figure 38:
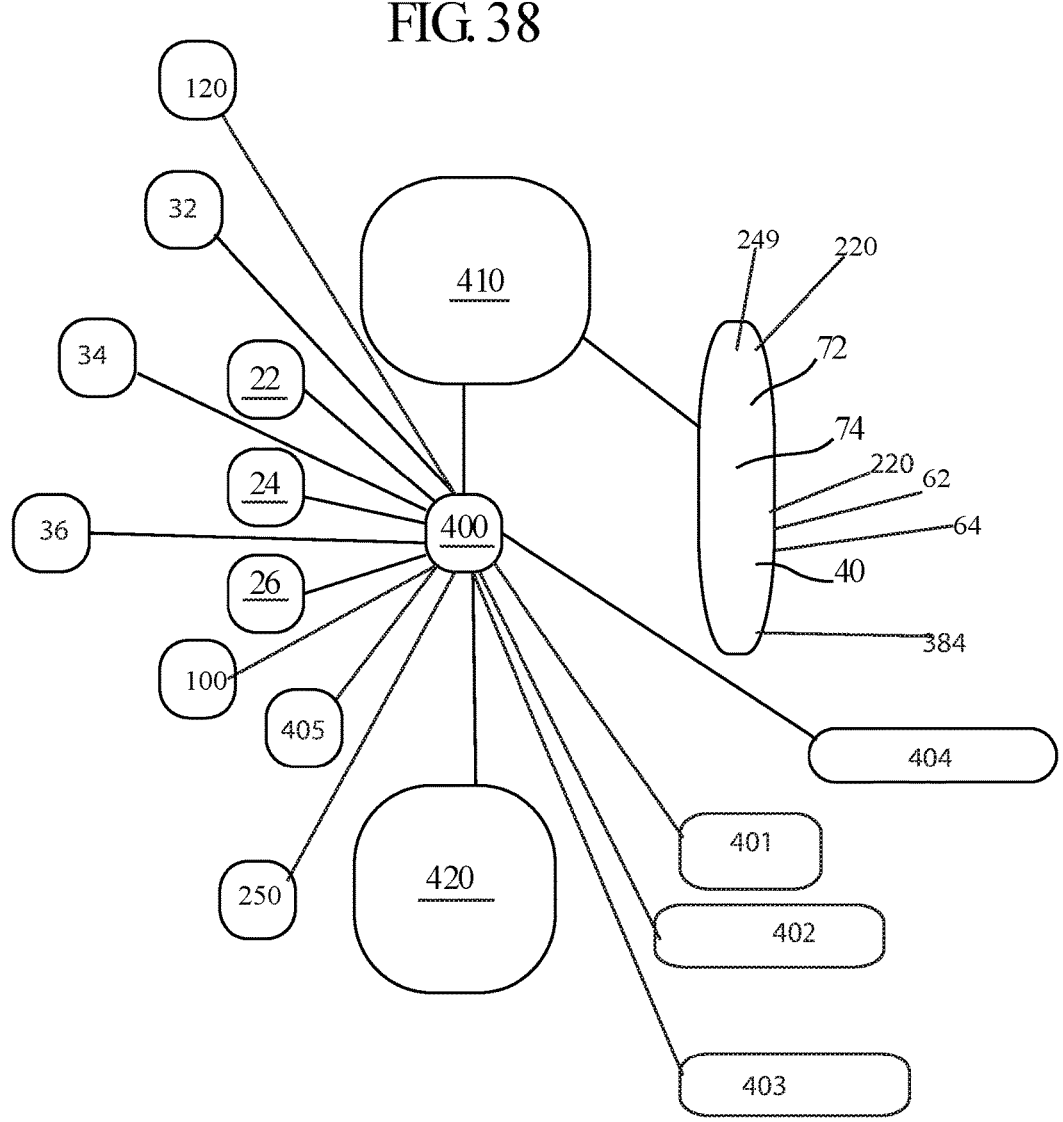
FIG. 38 is a schematic block diagram of the electronic components in communication with a central device such as a server.

Ultimately, this system can be designed to include a camera which can be configured to have a night vision camera, and an infrared sensor. FIG. 38 is a schematic block diagram of the embodiment of either FIG. 1A, 2A, 3, or 4. In this view there are cameras 22, 24, and 26 which are coupled to aggregator 400. Aggregator 400 is coupled to video compression device 410. Video compression device 410 has an output to at least one screen 62, 64, or 40, or screens 72, 74, or screens 220, or 249. In addition coupled to aggregator 400 is a video recorder 420 which is configured to selectively record video signals taken in from aggregator 400. Thus the device can serve as a black box video recorder as well. The cameras and screens for the embodiment of FIG. 5 can also be included in this block diagram as well. As shown in this view there is a first device 401 which acts as a recorder for the information such as speed, orientation, GPS provided by GPS system 618A, and other coordinates to serve for additional black box recording. In addition there is another device 402, which allows for the device to be coupled to or at least in communication with an outside cloud storage device. Thus, this device includes a wireless communication element such as a SIM card such as SIM card 616 or other wireless communication device. Another optional feature is a communication device 403 which is configured to communicate with an automobile to automatically stop an automobile. This device 403 can be preset with certain instances such as when it views a pedestrian in a cross walk or other obstruction. Device 403 can be wired into the auto's onboard computer to automatically brake the auto to stop the auto from hitting a person or object. This viewing device could then automatically either shut the auto down or disable the accelerator to prevent a party in a crosswalk from being hit. Essentially this device 403 reads the visual information from aggregator 400 and then processes the images from this information. Once it reads the information from this aggregator 400 and recognizes this information it then sends this information onto the automobile computer to either disable the auto or to disable the accelerator.

In addition, another camera control device 404 is configured to control the cameras such as cameras 22, 24, and 26 or cameras 32, 34, and 36, 52, 54, 56 or cameras 100, 120, 250 or 580. Each of these cameras can have in their body devices to control focus, pan, tilt, zoom, etc. Device 404 is thus configured to control the pan, tilt, zoom, a focus of each of these cameras and is configured to communicate through aggregator 400 so that each of these individual cameras is controlled. The controls of these cameras can be located in the dashboard of the auto, or on the steering wheel of the auto or on any one of the screens described above.

In addition, coupled to aggregator 400, is the onboard auto computer which communicates with this aggregator all of the information from the auto including the state of the auto. In addition, any controls located on the auto can be fed through the auto's onboard computer 405 through to the video aggregator 400, and then onto any one of the devices 401, 402, 403, or 404.

The aggregator 400 and also the components coupled either directly or indirectly to the aggregator 400 are coupled to the auto's onboard computer 405, in a communicative manner as well as in an electrically powered manner so that information and electrical power is passed between these components.

Each of these cameras can also be controlled by camera control device or lens 404 so that these cameras can render infrared, thermal, night vision or any other type of view known in the art and requested by the user.

Each of these components can communicate with each other via a wired connection. Alternatively each of these components such as the cameras 22, 24, 26, 32, 34, 36, 52, 54, 56, 100, 120, 250, 580 can include an associated wireless transceiver also communicate in a wireless manner with any one of the suitable screens such as screens 249, 220, 72, 74, 62, 64, 40 or 511 also selectively having a wireless transceiver. The communication can be via wireless internet protocols such as WIFI, bluetooth or any other suitable wireless communication protocol.

Thus, the system is designed to allow for communication and control from multiple different cameras to multiple different screens either in a wired or wireless manner to allow the user to see in different blind spots. In addition the system allows for the mounting and positioning of multiple different screens or cameras wherein these screens and cameras can be positioned around a moving vehicle.

Accordingly, while at least one embodiment of the present invention has been shown and described, it is obvious that many changes and modifications may be made thereunto without departing from the spirit and scope of the invention.

What is claimed is:

1. A viewing system coupled to a motor vehicle having a frame having a roof, at least one support, and a body with the at least one support supporting the roof over the body, the system comprising:
   a) at least one camera; and
   b) at least one screen coupled to the at least one support; wherein said at least one camera is coupled to the at least one support and wherein said at least one screen is in communication with said at least one camera, wherein said at least one screen displays images presented by said at least one camera;
      at least one coupling bracket coupled to said at least one support, wherein said at least one coupling bracket comprises a plurality of prongs configured to be coupled to said at least one screen.

2. The viewing system as in claim 1, wherein said at least one screen is coupled to said at least one support.

3. The viewing system as in claim 1, wherein a first set of cameras comprises at least three cameras.

4. The viewing system as in claim 1, further comprising at least one additional set of cameras.

5. The viewing system as in claim 1, wherein at least one additional set of cameras comprises at least three cameras.

6. The viewing system as in claim 1, further comprising at least one aggregator coupled to said first set of cameras and wherein said at least one aggregator has an output coupled to said at least one screen.

7. The viewing system as in claim 6, further comprising at least one video compression device which is configured to compress the incoming video, wherein said video compression device has an output to said screen.

8. The viewing system as in claim 6, further comprising at least one video recorder.

9. A viewing system comprising:
   a) at least one bracket;
   b) at least one plug disposed adjacent to said bracket;
   c) at least one screen; and
   d) at least one camera, wherein said at least one camera is in communication with said screen such that said camera provides at least one video feed to said screen; wherein said at least one bracket comprises a plurality of prongs configured to be coupled to said at least one screen.

10. The viewing system as in claim 9, further comprising at least one line disposed between said screen and said camera connecting said screen and said camera together to allow signals from said camera to flow from said camera to said screen.

11. A viewing system coupled to a motor vehicle having a frame having a roof, at least one support, and a body with the at least one support supporting the roof over the body, the system comprising:
   a) at least one camera;
   b) at least one support bracket comprising at least one universal joint;
   c) at least one screen coupled to the at least one support bracket, wherein said at least one screen is configured to be adjusted in a plurality of different angles; and wherein said at least one screen is in communication with said at least one camera, wherein said at least one screen displays images presented by said at least one camera;
      at least one coupling bracket coupled to said at least one support bracket, wherein said at least one coupling bracket comprises a plurality of prongs configured to be coupled to said at least one screen.

12. The viewing system as in claim 11, further comprising at least one projector in communication with said at least one camera, wherein said at least one projector is configured to project an image onto a windshield.

13. The viewing system as in claim 11, further comprising at least one mounting bracket wherein said at least one mounting bracket is configured to be mounted on a side of an automobile, and wherein said at least one camera is configured to be mounted on said at least one mounting bracket.

14. The viewing system as in claim 13, wherein said at least one mounting bracket comprises at least one curved surface positioned substantially opposite a surface supporting said at least one camera.

15. The viewing system as in claim 11, wherein the at least one support bracket comprises at least two ball joints for adjustment of a screen.

* * * * *